(12) United States Patent
Guo et al.

(10) Patent No.: US 12,347,468 B2
(45) Date of Patent: Jul. 1, 2025

(54) ENERGY-ASSISTED MAGNETIC RECORDING DATA STORAGE DEVICE WITH OPPORTUNISTIC BOOSTED LASER PRE-BIASING

(71) Applicant: WESTERN DIGITAL TECHNOLOGIES, INC., San Jose, CA (US)

(72) Inventors: Guoxiao Guo, Irvine, CA (US); Kei Yasuna, Fujisawa (JP); William B. Boyle, Lake Forest, CA (US); Qinghua Zeng, Fremont, CA (US); Dan Wang, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/516,146

(22) Filed: Nov. 21, 2023

(65) Prior Publication Data
US 2024/0221784 A1      Jul. 4, 2024

Related U.S. Application Data

(60) Provisional application No. 63/435,721, filed on Dec. 28, 2022, provisional application No. 63/523,724, filed on Jun. 28, 2023.

(51) Int. Cl.
*G11B 11/10*     (2006.01)
*G11B 5/012*     (2006.01)
(Continued)

(52) U.S. Cl.
CPC ............... *G11B 5/03* (2013.01); *G11B 5/012* (2013.01); *G11B 5/596* (2013.01); *G11B 5/59655* (2013.01); *G11B 2005/0021* (2013.01)

(58) Field of Classification Search
CPC ........... G11B 7/1263; G11B 5/02; G11B 5/40; G11B 2005/0021; G11B 5/0261;
(Continued)

(56) References Cited

U.S. PATENT DOCUMENTS

| 8,787,125 | B1  | 7/2014  | Lee |
| 9,019,646 | B2* | 4/2015  | Rausch ................ G11B 5/6088 |
|           |     |         | 360/59 |
| 9,202,506 | B1  | 12/2015 | Mader et al. |
| 9,620,162 | B1  | 4/2017  | Haralson |

(Continued)

FOREIGN PATENT DOCUMENTS

WO      2017/160230      9/2017

OTHER PUBLICATIONS

Xiong et al., "Compensation for the Write Start Transient in Heat-Assisted Magnetic Recording," https://ieeexplore.ieee.org/document/8017415, Aug. 29, 2017, 4 pages.

(Continued)

*Primary Examiner* — Nabil Z Hindi
(74) *Attorney, Agent, or Firm* — Calderon Safran & Wright P.C.

(57) ABSTRACT

Various illustrative aspects are directed to a data storage device including one or more disks, an actuator mechanism configured to position a selected head among one or more heads proximate to a corresponding disk surface among the one or more disks, the selected head comprising a write element and an assistive energy emitter, and one or more processing devices configured to, individually or in combination: apply an assistive energy current to the assistive energy emitter while refraining from applying a write current to the write element, and vary a level of the assistive energy current over time while refraining from applying the write current to the write element.

20 Claims, 13 Drawing Sheets

(51) Int. Cl.
    *G11B 5/03*     (2006.01)
    *G11B 5/596*     (2006.01)
    *G11B 5/00*     (2006.01)

(58) Field of Classification Search
    CPC ....... G11B 5/012; G11B 19/046; G11B 11/10; G11B 11/105
    USPC ..................................................... 360/75, 59
    See application file for complete search history.

(56) References Cited

U.S. PATENT DOCUMENTS

| | | | |
|---|---|---|---|
| 9,842,619 | B1 | 12/2017 | Chu et al. |
| 9,916,851 | B1 * | 3/2018 | Seigler .................... G11B 5/02 |
| 10,657,987 | B1 | 5/2020 | Chu et al. |
| 11,694,712 | B2 | 7/2023 | Poss et al. |
| 12,046,265 | B1 | 7/2024 | Guo et al. |
| 2024/0221779 | A1 | 7/2024 | Guo et al. |

OTHER PUBLICATIONS

Xiong et al., "Spacing Control in Heat-Assisted Magnetic Recording," https://ieeexplore.ieee.org/abstract/document/8467381, Sep. 18, 2018, 6 pages.

Xiong et al., "Spacing Dependency of Near Field Recording and Its Application," https://www.researchgate.net/publication/328949611_Spacing_Dependency_of_Near_Field_Recording_and_its_Application, Aug. 2018, 4 pages.

Ma et al., "Writing Process Modeling and Identification for Heat-Assisted Magnetic Recording," https://ieeexplore.ieee.org/abstract/document/7575670, Sep. 23, 2016, 8 pages.

Notice of Allowance dated Jul. 24, 2024 in related U.S. Appl. No. 18/232,145, 5 pages.

Non-Final Rejection dated Mar. 26, 2024 in related U.S. Appl. No. 18/232,145, 7 pages.

Notice of Allowance dated Apr. 2, 2024 in related U.S. Appl. No. 18/232,128, 8 pages.

* cited by examiner

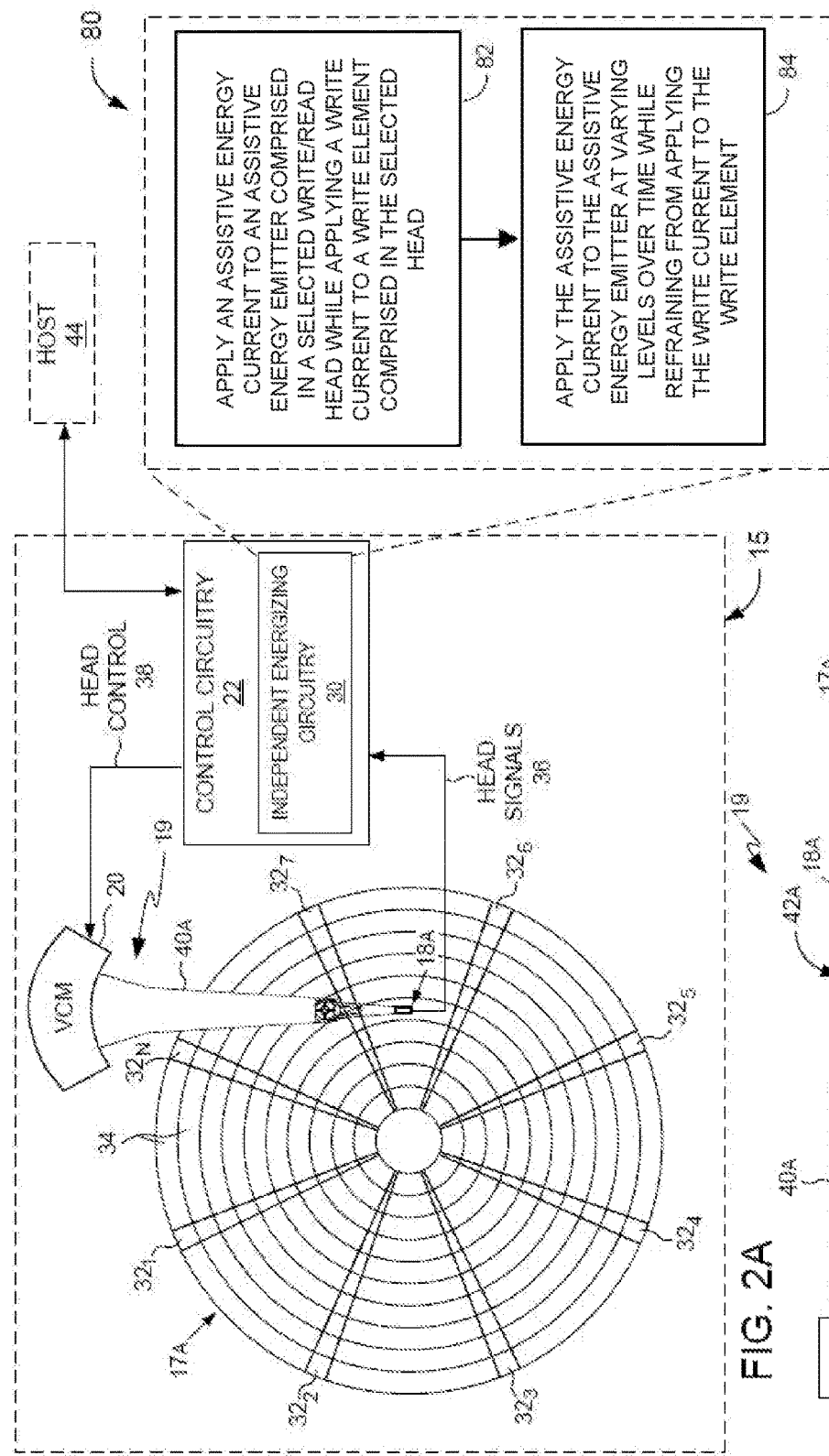
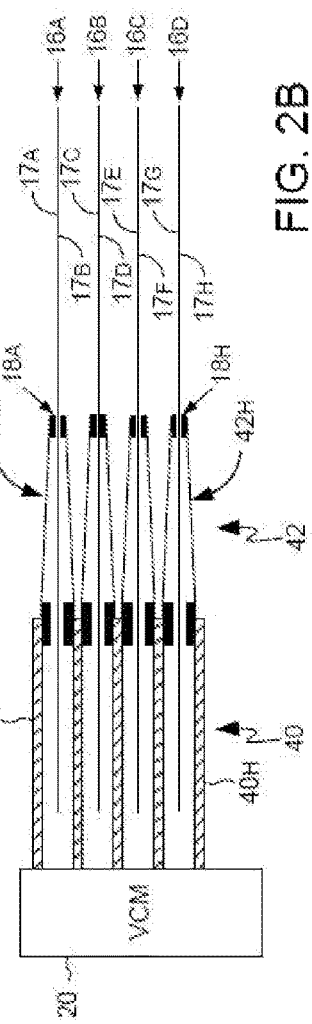
FIG. 2A
FIG. 2B
FIG. 2C

ENERGY-ASSISTED MAGNETIC RECORDING DATA STORAGE DEVICE WITH OPPORTUNISTIC BOOSTED LASER PRE-BIASING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry that includes novel and inventive circuitry for pre-energizing an assistive energy emitting element in energy-assisted magnetic recording, such as applying a laser pre-bias current to a laser diode preparatory to write operations in a heat-assisted magnetic recording (HAMR) disk drive, independently of write current, in accordance with aspects of the present disclosure. By doing so, data storage devices of this disclosure may optimize the laser diode and the head for nominal energy-assisted write operations, thereby enhancing data storage performance.

In conventional HAMR disk drives, operating the lasers in the read/write heads involves complex effects both in the laser diodes and on the fly height, or head-disk spacing, between the write element pole tips of the heads and the disk surfaces. Operating the laser diode involves evolving thermal and optical properties and hops between emission mode in the laser diode. Thermal energy from operating the laser induces protrusion and modification of a read/write head and evolving changes in the fly height over the course of a write operation, particularly during the initial interval of a write operation. These thermal effects on the laser diode, on head protrusion, and on fly height have typically interfered with nominal write strength and reliable writes, particularly during the initial stage of an attempted write operation. Recent advances in HAMR technologies have included applying an early partial pre-bias current to a laser diode incorporated in a HAMR read/write head, prior to activating the laser at nominal current for write operations, but laser pre-bias has introduced its own new complications in HAMR write operations. Another recent compensation technique for unreliable initial write strength has been to wait until thermal energy and thermally driven head protrusion have stabilized before writing, but this adds latency and results in wasted disk capacity for unpredictably affected sectors.

Disk drives of this disclosure introduce novel, inventive techniques for pre-energizing an assistive energy emitting element in energy-assisted magnetic recording, thereby resolving various shortcomings of conventional HAMR disk drives and enabling novel advantages in data storage performance characteristics, such as data density and reliability and disk drive longevity in HAMR disk drives, in various aspects as further described below. A disk drive of this disclosure may include novel and inventive circuitry and firmware for applying and operating laser pre-bias at boosted values that are higher than conventional, conservatively safe laser pre-bias values, at suitable down-track positions prior to the data sector or sectors to which to write. A disk drive of this disclosure may apply inventive techniques to keep the boosted laser pre-bias still safe for existing data, even while it is higher than conventional, safe laser pre-bias values. To distinguish from the conventional, conservatively safe laser pre-bias values that are applied while the head is proximate to existing data and servo patterns in conventional HAMR drives, the heightened levels of pre-bias current of this disclosure above conventional baseline pre-bias are referred to herein as boosted laser pre-bias or boosted pre-bias.

Conventional HAMR disk drive circuitry and firmware are designed around the assumption that, and are configured such that, the assistive energy current to apply to the assistive energy emitter such as the laser diode, including for laser pre-bias, is operated in tandem with the write current to apply to the write element. Among the inventive insights of this disclosure, operating the assistive energy current independently of the write current enables new freedoms and opportunities to apply pre-bias or pre-energizing assistive energy current to the assistive energy emitter such as the laser diode for advantageous effects. Disk drives of this disclosure comprise circuitry and firmware configured to apply assistive energy current independently of the write current.

By applying assistive energy current independently of the write current, disk drives in various examples of this disclosure are enabled to implement novel opportunistic pre-energizing of the assistive energy emitter, preparatory to write operations, beyond ways that are possible with conventional disk drives. In various examples, disk drives of this disclosure are enabled to apply boosted pre-bias current to the laser diode to prepare the laser diode to be close to thermal and optical steady state, and to prepare the head to be close to thermal, morphological, and aerodynamic steady state, from before to after initiating a heat-assisted write operation. In various examples, disk drives of this disclosure are enabled to bring the laser diode and the head closer to write operation conditions during boosted laser pre-biasing, or applying boosted pre-bias current to the laser emitter, than is possible in conventional disk drives. Disk drives of this disclosure are further enabled to arrange formatting of write operations to optimize for optimal opportunities for pre-energizing the assistive energy element, in various examples. In various examples, disk drives of this disclosure may thereby ensure more reliable and more highly assured nominal performance of write operations, particularly on initiation of the write operations, than is possible in conventional energy-assisted magnetic recording disk drives. These and other novel and inventive aspects of this disclosure are further described below.

Various illustrative aspects are directed to a data storage device comprising one or more disks, an actuator mechanism configured to position a selected head among one or more heads proximate to a corresponding disk surface among the one or more disks, the selected head comprising a write element and an assistive energy emitter, and one or more processing devices configured to, individually or in combination: apply an assistive energy current to the assistive energy emitter while refraining from applying a write current to the write element, and vary a level of the assistive energy current over time while refraining from applying the write current to the write element.

Various illustrative aspects are directed to a method comprising: applying, by one or more processing devices individually or in combination, an assistive energy current to an assistive energy emitter comprised in a selected head of a data storage device while applying a write current to a write element comprised in the selected head, and while the write element is positioned proximate to a data sector; powering down, by the one or more processing devices individually or in combination, the write current after finishing writing to the data sector; and applying, by the one or more processing devices individually or in combination, the assistive energy current to the assistive energy emitter at varying levels over time while refraining from applying the write current to the write element.

Various illustrative aspects are directed to one or more processing devices comprising: means for applying an assistive energy current to an assistive energy emitter comprised in a selected head of a data storage device while applying a write current to a write element comprised in the selected head, and while the write element is positioned proximate to a data sector; means for powering down the write current after finishing writing to the data sector; and means for applying the assistive energy current to the assistive energy emitter at varying levels over time while refraining from applying the write current to the write element.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts.

In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, including for applying independent, pre-energizing assistive energy current to the assistive energy emitter while refraining from applying a write current to the write element, in accordance with aspects of the present disclosure.

DETAILED DESCRIPTION

Figure 1:
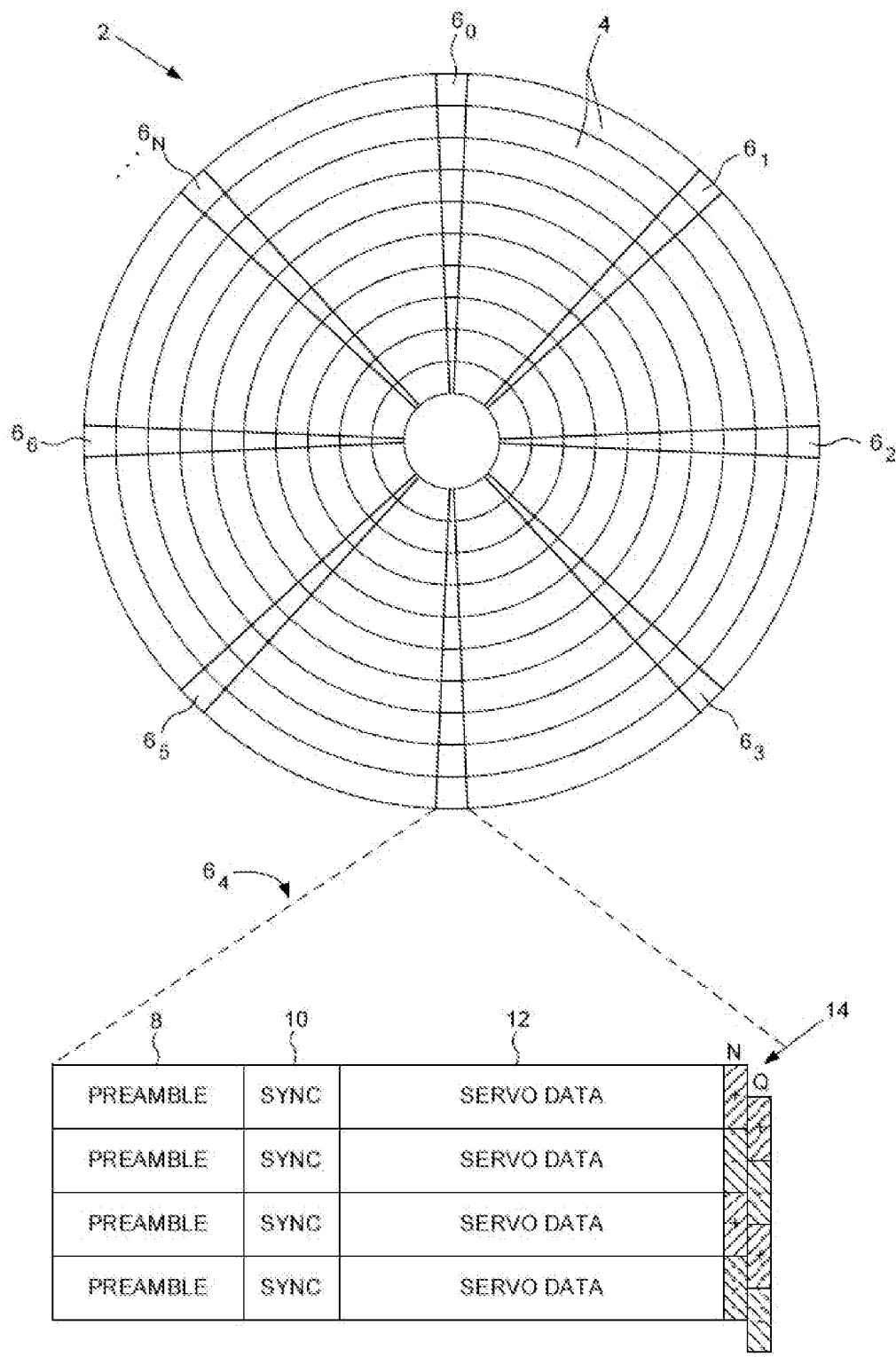
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises independent energizing circuitry 30. FIG. 2C depicts a flowchart for an example method 80 that independent energizing circuitry 30 of control circuitry 22 may perform or execute in controlling the operations of disk drive 15, in accordance with aspects of the present disclosure, including operations involved in applying an independent, pre-energizing assistive energy current to the assistive energy emitter while refraining from applying a write current to the write element, thereby achieving novel advantages in superior data storage performance, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to fly and operate "above" a corresponding disk surface 17 in a local frame of reference in accordance therewith, such that head 18 flies and operates positioned in flight proximate to corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

Thus, disk drive 15 is an example of a data storage device comprising one or more disks 16; an actuator mechanism in the form of actuator arm assembly 19 which is configured to position a selected head 18 among one or more heads 18 proximate to a corresponding disk surface 17 among the one or more disks 16; and one or more processing devices, in the form of control circuitry 22 including independent energizing circuitry 30. The selected head 18 also comprises a write element and an assistive energy emitter, as further described below.

In executing example method 80 of FIG. 2C (aspects of which will also be further explained below with reference to the further figures), control circuitry 22 comprising independent energizing circuitry 30 may issue one or more commands to other components of disk drive 15, receive information from one or more other components of disk drive 15, and/or perform one or more internal operations, such as generating one or more driver currents for outputting to system components of disk drive 15. In particular, control circuitry 22 comprising independent energizing circuitry 30 may be configured to apply an assistive energy current to the assistive energy emitter comprised in a selected write/read head 18 while applying a write current to a write element comprised in the selected head 18 (82). Further, independent energizing circuitry 30 of control circuitry 22 may be configured to apply an assistive energy current to the assistive energy emitter at varying levels while refraining from applying a write current to the write element (84). For example, independent energizing circuitry 30 may be configured to apply the assistive energy current in the form of a boosted laser pre-bias current to an assistive energy emitter in the form of a laser diode while the assistive energy interface in the form of a near-field transducer (NFT) is positioned proximate to an area preceding a servo pattern of the corresponding disk surface, which may comprise a write-to-read recovery (WRR) area between a data sector and the servo pattern. The boosted pre-bias current may be greater than a conventional, conservatively safe pre-bias current.

Control circuitry 22 comprising independent energizing circuitry 30 may perform and implement further methods such as described below. Control circuitry 22, including independent energizing circuitry 30, may further perform additional actions, methods, and techniques, in accordance with various aspects including as further described herein.

The term "independent energizing circuitry 30" as used herein may refer to any hardware, firmware, software, and/or combination thereof, comprised in control circuitry 22 of disk drive 15, which implements, embodies, or engages in any of the structures or functions ascribed herein to independent energizing circuitry 30 or to any other of the novel and inventive aspects of the present disclosure. Independent energizing circuitry 30 may constitute any hardware, firmware, software, and/or any other elements of control circuitry 22 for controlling boosted laser pre-bias, boosted microwave pre-bias, or other types of boosted pre-bias, pre-energizing, or preparatory assistive energy current applied while refraining from applying a write current, using calibration data stores to optimize applying boosted pre-energizing or boosted pre-bias assistive energy current (e.g., optimizing time spent applying a boosted pre-bias current and optimizing values of the boosted pre-bias current applied) while refraining from applying a write current, formatting servo pattern and data sector areas, and performing other techniques and methods as described herein.

Figure 3:
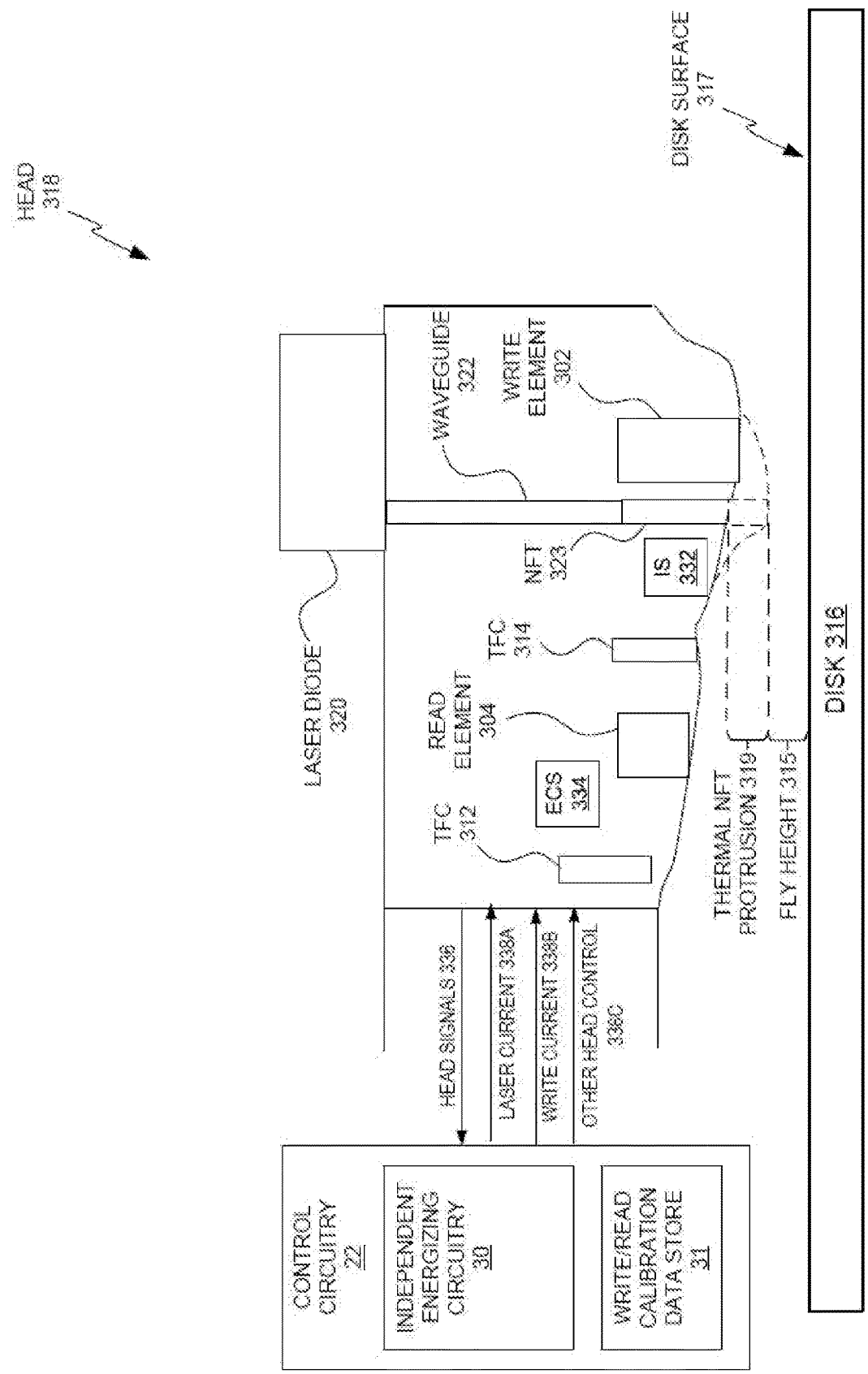
FIG. 3 depicts a conceptual side view diagram of a head of a disk drive, suspended above and operating proximate to a corresponding disk surface, under control of control circuitry comprising independent energizing circuitry, and demonstrating changes in protrusion and aerodynamic profile causing changes in fly height, or head-disk spacing, due to effects such as thermally induced protrusion of the write tip and the near-field transducer (NFT), in accordance with various aspects of this disclosure.

FIG. 3 depicts a conceptual side view diagram of a head 318 of a disk drive, suspended above and operating proximate to a corresponding disk surface 317 of disk 316, under control of control circuitry 22, in accordance with various aspects of this disclosure. Disk surface 317 and head 318 may be respective implementations of any of disk surfaces 17 and heads 18 as depicted in FIGS. 2A and 2B. Control circuitry 22 comprises independent energizing circuitry 30 and a write/read calibration data store 31, in this example. FIG. 3 is a conceptual diagram and not an engineering schematic, and the elements depicted may be disposed in any of a variety of arrangements in different examples.

Independent energizing circuitry 30 may apply an assistive energy current to the assistive energy emitter in the form of a laser diode 320 while refraining from applying a write current to a write element 302. The example of FIG. 3 is further described as follows with respect to the example depicted in FIG. 3 in which the disk drive is a HAMR drive and the assistive energy emitter is implemented as laser diode 320, operatively coupled via waveguide 322 to NFT 323. FIG. 3 depicts an example thermal NFT protrusion 319 and aerodynamic profile causing changes in fly height 315, or head-disk spacing, due to effects such NFT pole tip protrusion (NPTP) of NFT 323 due to heating or other energizing by a laser or other energy source, in accordance with various aspects of this disclosure.

Control circuitry 22 outputs head control signals 338 to head 318, and receives head signals 336 (including control signals and data) from head 318. Head control signals 338 are differentiated among laser current control signals 338A that independent energizing circuitry 30 applies, independently of write current 338B and other head control signals 338C that other aspects of control circuitry 22 applies. Head 318 includes write element 302, a read element 304, thermal fly height (TFC) control elements 312 and 314, and a laser-generating component such as a laser diode 320 configured for emitting a laser via waveguide 322 and an assistive energy interface in the form of NFT 323. The laser induces a plasmon that heats a track on disk surface 317 that passes proximate to write element 302 as head 318 flies over or proximate to disk surface 317. Head 318 is thus an example of a selected head that comprises a write element 302 and an assistive energy emitter in the form of laser diode 320, in this example.

Control circuitry 22 writes data to disk surface 317 by modulating a write current in an inductive write coil in write element 302, to record magnetic transitions onto corresponding disk surface 317 in a process referred to as saturation recording. During readback, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium of disk surface 317, such as, e.g., superparamagnetic iron-platinum nanoparticles, by heating disk surface 317 with a laser emitted by laser diode 320 via waveguide 322 and NFT 323 during write operations. Such heating of disk surface 317 decreases the coercivity of the magnetic medium of disk surface 317, thereby enabling the magnetic field generated by the write coil of write element 302 to magnetize the temporarily heated area of disk surface 317. The disk surface encoding the data thus written then cools back down and thereby returns to heightened magnetic coercivity, which durably preserves the written data at higher density than is possible in conventional techniques such as perpendicular magnetic recording (PMR).

Any suitable technique may be employed to heat the surface of the disk in HAMR recording, such as with a laser-generating component such as laser diode 320 and NFT 323 disposed proximate to write element 302 of head 318 as in the example of FIG. 3. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

A certain increment of laser current may typically have a regular, predictable, linear, or approximately linear in a small operating range, corresponding with a certain increment of power, a certain incremental change in NFT protrusion displacement, and a certain incremental change in fly height spacing (within a practically applicable range), in various examples. For instance, in various illustrative examples of this disclosure, the laser threshold current, the nominal write laser current for performing write operations, and various boosted laser pre-bias current levels, applicable fly height spacing, and applicable TFC power may be measured in any of various values applicable to a modern disk drive, in various examples. Applicable levels of laser current, fly height, and TFC power may also be in ranges greater or less than such values in other examples.

Independent energizing circuitry 30 may control the operation of head 318 to inventively optimize opportunities to apply boosted pre-bias to laser diode 320 in ways beyond what is possible in conventional disk drives employing only conventional, conservatively safe pre-bias, to provide a stronger initial write strength starting from the beginning of a write operation, among other advantages. Laser pre-bias management circuitry 30 applies boosted laser pre-bias current sufficient to initiate the new write operation reliably, yet also while avoiding erasing data and servo patterns in the one or more preceding sectors, through means comprising techniques for optimizing time spent applying pre-energizing assistive energy current and optimizing values of the pre-energizing current while refraining from applying write current, in various examples. Example details of functions and methods that independent energizing circuitry 30 is configured to perform, in an example implementation focused on a HAMR disk drive, are further described as follows.

Figure 4:
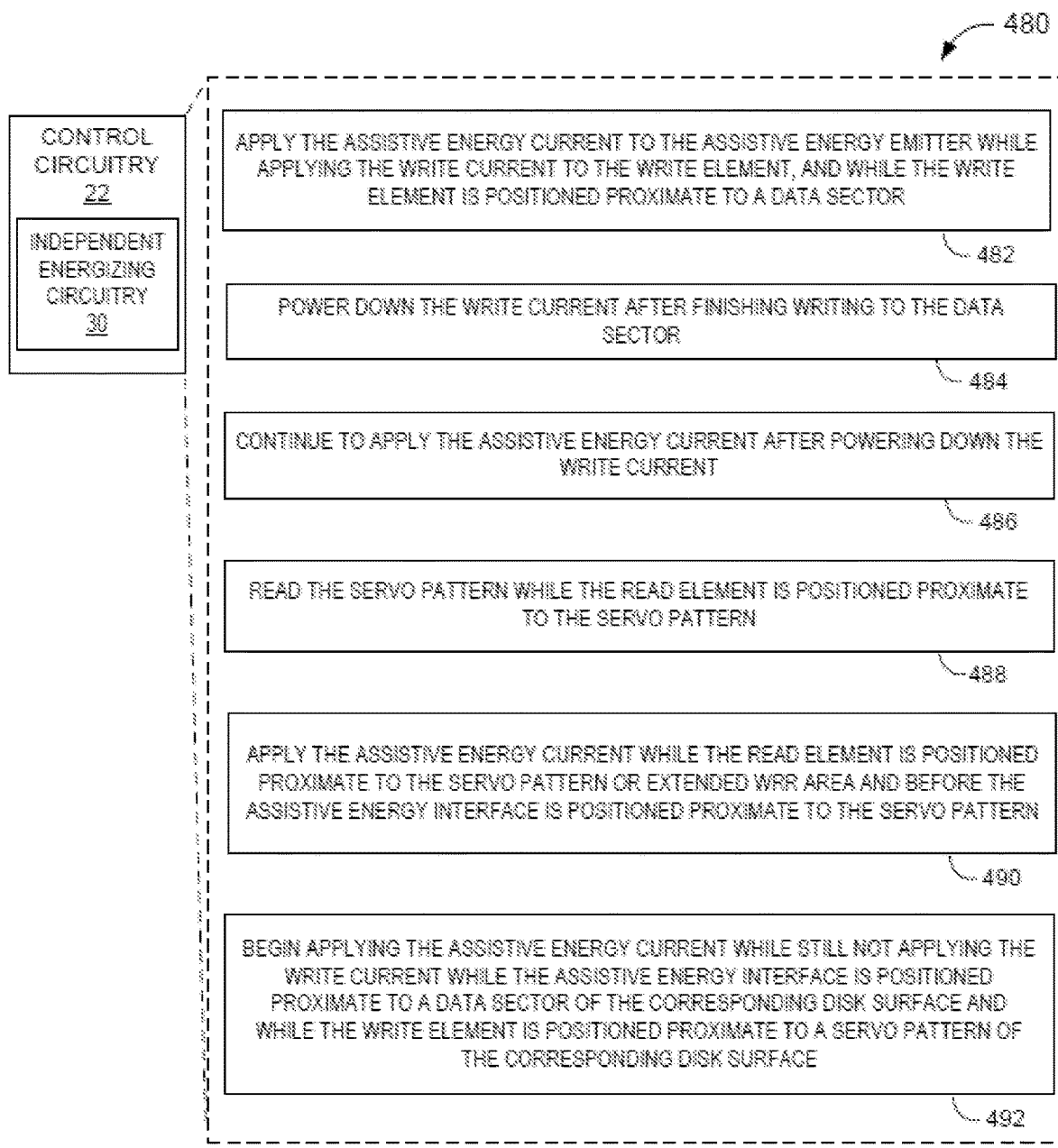
FIG. 4 depicts a flowchart for another example method that control circuitry comprising independent energizing circuitry may perform and implement, in accordance with aspects of the present disclosure.

FIG. 4 depicts a flowchart for another example method 480 that control circuitry 22 comprising independent energizing circuitry 30 may perform and implement, in accordance with aspects of the present disclosure. FIGS. 5A-5E each depict a head 518 in a sequence of states over time corresponding to various elements of method 480, in accordance with various aspects of this disclosure. Head 518 may be an implementation of heads 18 and 318 as described above. The flowchart for method 480 is depicted without arrows to emphasize that the various elements depicted are not necessarily in a given sequential order, and control circuitry 22 comprising independent energizing circuitry 30 may perform some elements simultaneously, at overlapping times, or in other orders.

In method 480, control circuitry 22 comprising independent energizing circuitry 30 is configured to apply the assistive energy current (e.g., boosted laser pre-bias current) to the assistive energy emitter (e.g., laser diode 320) while applying the write current to the write element, and while the write element is positioned proximate to a data sector (482, analogous to 82 in FIG. 2C). Control circuitry 22 comprising independent energizing circuitry 30 is further configured to power down the write current after finishing writing to the data sector (484), wherein applying the assistive energy current to the assistive energy emitter while refraining from applying the write current to the write element comprises continuing to apply the assistive energy current after powering down the write current (486, analogous to 84 in FIG. 2C), as also further described below with reference to FIGS. 5A and 5B.

Control circuitry 22 comprising independent energizing circuitry 30 is further configured to read the servo pattern while read element is positioned proximate to the servo pattern (488). Applying the boosted assistive energy current to the assistive energy emitter while refraining from applying the write current to the write element may further comprise applying the assistive energy current while the read element is positioned beyond the end of the data, proximate to the servo pattern or extended WRR area, and before the assistive energy interface (e.g., NFT 323) is positioned proximate to the servo pattern (490), as also further described below with reference to FIG. 5C. This arrangement in which the read element is positioned beyond the end of the data, and before the assistive energy interface is positioned proximate to the servo pattern, may take place either while the read element is positioned proximate to the servo pattern, in cases of standard write-to-read recovery (WRR) area, or while the read element is positioned beyond the end of written data though still within the sector prior to the servo pattern, in cases in which the write operation is finished before filling up the sector with data. In cases in which the write operation is finished before filling up the sector with data, the unused remainder of the data sector along with the standard WRR area may be considered to form an extended WRR area, as further explained below. Control circuitry 22 comprising independent energizing circuitry 30 is further configured to begin applying the assistive energy current while still not applying the write current while the assistive energy interface is positioned proximate to a data sector of the corresponding disk surface and while the write element is positioned proximate to a servo pattern of the corresponding disk surface (492), as also further described below with reference to FIG. 5E.

FIGS. 5A-5E each depict a conceptual side view diagram of a head 518, suspended above and operating proximate to a corresponding disk surface 317, in a sequence of states over time, corresponding to various elements of method 480, in accordance with various aspects of this disclosure. Head 518 may be an implementation of heads 18 and head 318 as described above. In all of FIGS. 5A-5E, the depictions are conceptually illustrative and are not engineering schematics, and the depicted features are not necessarily to scale.

Figure 5A:
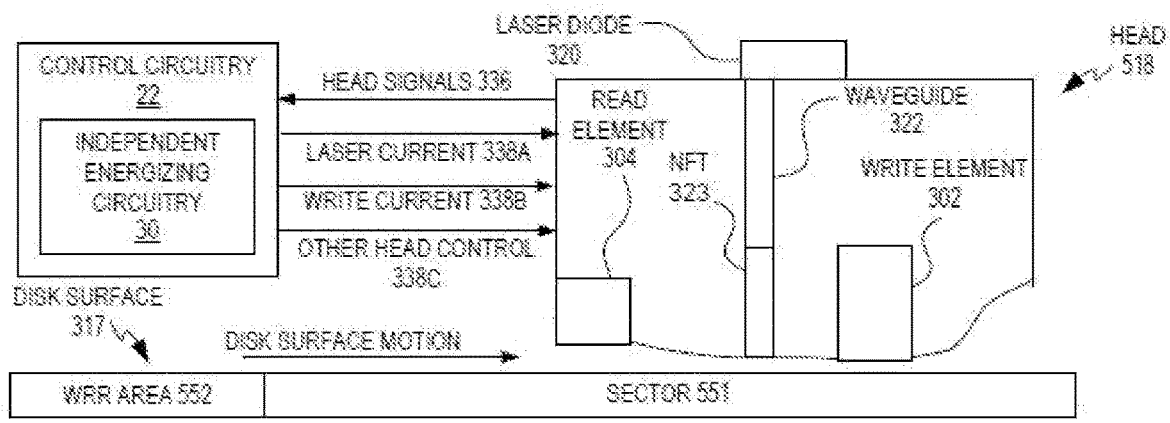
FIGS. 5A-5E each depict a conceptual side view diagram of a head, suspended above and operating proximate to a corresponding disk surface, in a sequence of states over time, corresponding to various elements of method, in accordance with various aspects of this disclosure.

FIG. 5A depicts a conceptual side view of head 518 positioned entirely over a representative data sector 551 of disk surface 317, in accordance with aspects of this disclosure. Head 518 is positioned toward the end of the data sector, such that WRR area 552 between data sector 551 and a subsequent servo pattern and head 518 are approaching each other. Control circuitry 22 may be conducting a write operation to data sector 551. As part of the write operation, control circuitry 22 may apply an assistive energy write laser bias current to laser diode 320 while applying a write current to write element 302, and while write element 302 is positioned proximate to data sector 551 (482 in FIG. 4). In other examples, control circuitry 22 may also have already finished conducting a write operation to data sector 551 if it finished writing the data for the write operation with some track space left over in data sector 551. In either case, control circuitry 22 powers down the write current after finishing writing to the data sector (484 in FIG. 4). In other examples, sector 551 may be an empty sector that independent energizing circuitry 30 uses for applying a boosted laser pre-bias current to laser diode 320 and performing a boosted warmup of laser diode 320 before writing to a next sector 554.

Independent energizing circuitry 30 may then apply the assistive energy current to laser diode 320 while refraining from applying the write current to write element 302, by continuing to apply the assistive energy current to laser diode 320 after powering down the write current to write element 302 (486 in FIG. 4). If control circuitry 22 has finished writing the data to be written prior to reaching the end of data sector 551, then independent energizing circuitry 30 continues applying the assistive energy current to laser diode 320 after control circuitry 22 has powered down the write current or otherwise refrained from applying the write current to write element 302 while head 518 is still positioned proximate to data sector 551 as shown in FIG. 5A. Refraining from applying the write current to write element 302 may include applying no current to write element 302, or applying only a negligible or low or baseline level of current to write element 302 that is below a write value of current when read element 304 is reading a subsequent servo pattern (described below), such that there is no cross-talk of write signal in the servo readback signal as detected from the servo pattern via read element 304.

Independent energizing circuitry 30 may now apply the assistive energy current to laser diode 320 at a boosted pre-bias value that may be independent of, and may not necessarily be related to, a write assistive value of laser current that control circuitry 22 applies to laser diode 320 during write operations and while also applying the write current to write element 302. Independent energizing circuitry 30 may now apply the assistive energy current to laser diode 320 at a boosted pre-bias value that is preparatory to the subsequent write operation, to optimize for design goals such as boosting the temperature of laser diode 320 and optimizing for a nominal start to a subsequent write operation in a subsequent data sector, taking into account a need to power down the laser diode 320 to a low or powered down state while head 518 flies proximate to the intervening servo pattern, as further described below.

Figure 5B:
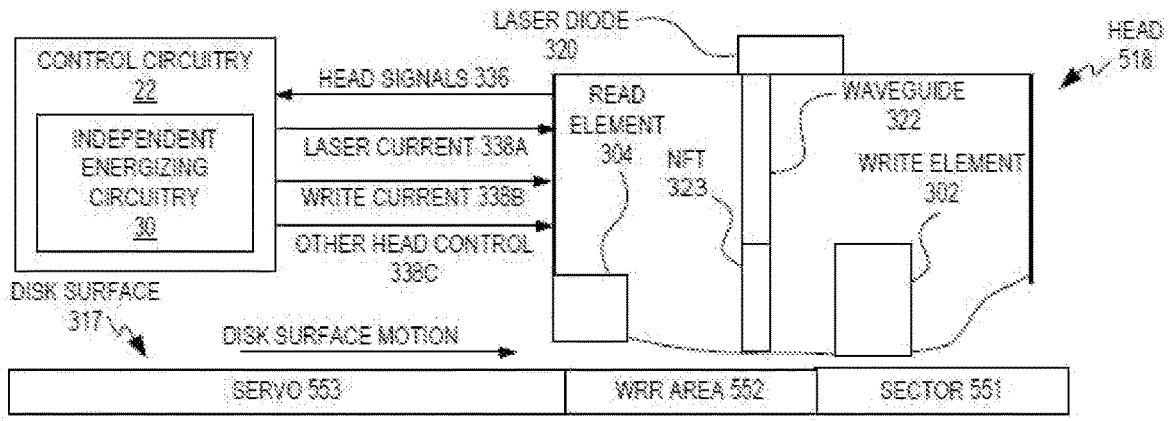

FIG. 5B depicts a conceptual side view of head 518 positioned in flight transitioning over the end of data sector 551 and a subsequent WRR area 552 between data sector 551 and a subsequent servo pattern 553, such that write element 302 is positioned proximate to the end of data sector 551, and NFT 323 is positioned over WRR area 552, subsequent to the state depicted in FIG. 5A, in accordance with aspects of this disclosure. If control circuitry 22 writes data to the entirety of data sector 551, the position depicted in FIG. 5B is that in which control circuitry 22 finishes writing to data sector 551 and powers down write element 302. WRR area 552 is designed for purposes including enabling a margin between write element 302 powering down before head 518 encounters servo pattern 553, to ensure avoiding signal interference between write element 302 and read element 304 for the servo read operation, and to ensure write element 302 has powered down by the time it flies into position proximate to servo pattern 553 and does not erode or erase any of servo pattern 553.

In the example shown in FIG. 5B, data sector 551 is completely filled, so WRR area 552 is a minimum WRR area defined by the dimensions of the down-track reader-to-writer offset (RWO, or the displacement between read element 304 and write element 302) ahead of servo sector 553. In other examples, a data sector may be finished being written without occupying the entirety of the potential data sector of the track space ahead of the servo sector and the minimum WRR area ahead of the servo sector. In these examples, among the inventive concepts of this disclosure, independent energizing circuitry 30 may, for purposes of manipulating the energy assistance current, treat the entire track length between the end of data in the potential data sector and the start of the subsequent servo pattern as an "extended WRR area" that is not limited by the RWO and is greater in length than the minimum WRR area, by an extra interval defining a gap area of the track. Independent energizing circuitry 30 may flexibly apply a boosted pre-bias current in any way that is advantageous during this extended WRR area, including in any way that is discussed herein with reference to the WRR area. Independent energizing circuitry 30 may also apply some current to the write element or refrain from applying current to the write element in the extended WRR area. The extended WRR area is further discussed below.

In cases in which control circuitry 22 writes data through the end of data sector 551 and then powers down write element 302 at the end of data sector 551, independent energizing circuitry 30 may begin applying assistive energy current in the form of boosted laser pre-bias current to laser diode 320 at a value independent of the nominal heat-assisted write value of laser bias current ("write laser bias current") applied to laser diode 320 for providing heat assistance during nominal write operations. This is after laser diode 320 has finished heating the end of data sector 551, and when NFT 323 flies into position over WRR area 552, in the position of head 518 relative to disk surface 317 as depicted in FIG. 5B. In cases in which control circuitry 22 finishes writing data to a pre-allocated short data sector without using the entire potential sector 551 and leaves an extended WRR, independent energizing circuitry 30 may continue applying assistive energy current, in the form of boosted laser pre-bias current in this example, to laser diode 320 at a value independent of the write laser bias current for providing heat assistance for write operations, as NFT 323 flies into position over an extended version of WRR area 552, in various examples (as further discussed below with reference to FIG. 5F). In either of these cases, after the powering down of write element 302 after finishing writing to data sector 551, independent energizing circuitry 30 may apply the assistive energy current to laser diode 320 at a value that is optimized for applying boosted laser pre-bias to prepare for the beginning of the subsequent write operation, in various examples.

Figure 5C:
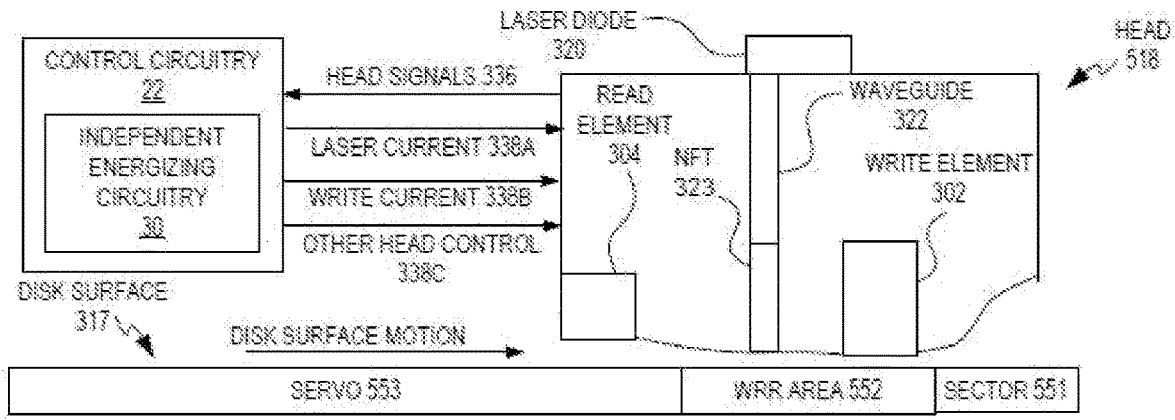

FIG. 5C depicts a conceptual side view of head 518 positioned in flight over WRR area 552 between data sector 551 and servo pattern 553 and beginning to intercept servo pattern 553, such that write element 302 and NFT 323 are both positioned proximate to WRR area 552, subsequent to the state depicted in FIG. 5B, in accordance with aspects of this disclosure. In various examples, independent energizing circuitry 30 may continue applying a boosted laser pre-bias current to laser diode 320 at a value independent of a write laser operation value, such as to prepare laser diode for a subsequent write operation, while control circuitry 22 refrains from applying a write current to write element 302, while write element 302 and NFT 323 are both positioned over WRR area 552, in the state depicted in FIG. 5C. Independent energizing circuitry 30 may thus apply the boosted laser pre-bias current to laser diode 320 while read element 304 is positioned proximate to servo pattern 553 and before the assistive energy interface in the form of NFT 323 is positioned proximate to servo pattern 553 (490 in FIG. 4). Control circuitry 22 may also begin reading servo pattern 553 as read element 304 becomes positioned proximate to servo pattern 553 (488 in FIG. 4, simultaneously with 490 in this example). Independent energizing circuitry 30 may thus apply an assistive energy boosted pre-bias current to the assistive energy emitter of laser diode 320, emitting via NFT 323, while read element 304 is positioned proximate to servo pattern 553 and while NFT 323 is positioned proximate to WRR area 552 preceding servo pattern 553.

Figure 5D:
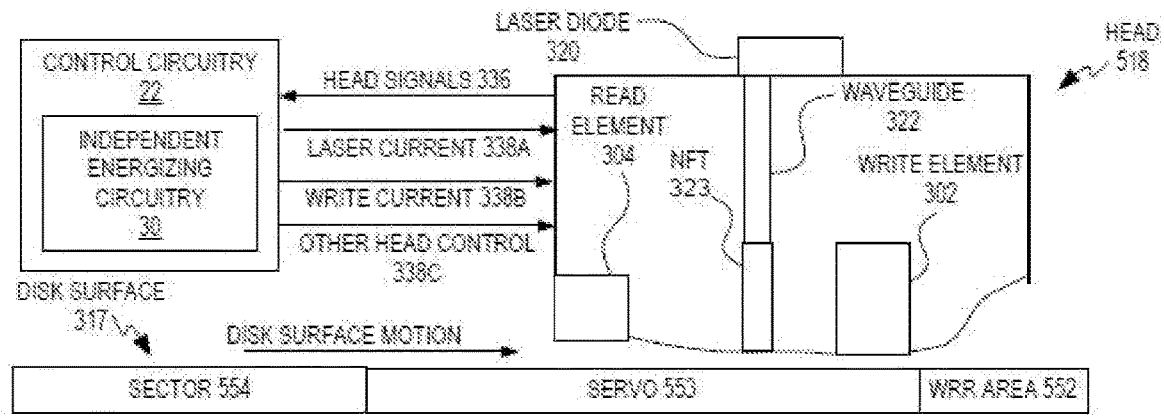

FIG. 5D depicts a conceptual side view of head 518 positioned in flight over servo pattern 553, subsequent to the state depicted in FIG. 5C, in accordance with aspects of this disclosure. In various examples, independent energizing circuitry 30 may refrain from applying a boosted laser pre-bias current to laser diode 320 while NFT 323 is positioned proximate to servo pattern 553. Refraining from applying the assistive energy current to laser diode 320 may include applying only a negligible or low or baseline level of current, or a conventional, non-boosted pre-bias current, to laser diode 320 that is below a write assistance value of current suitable for writing data or sufficient to damage existing data or servo patterns, or applying no current to laser diode 320, in various examples. Control circuitry 22 may continue refraining from applying a write current to write element 302 while write element 302 is positioned proximate to servo pattern 553. Control circuitry 22 may also continue reading servo pattern 553 while read element 304 is positioned proximate to servo pattern 553 (488 in FIG. 4, now subsequently to 490 in this example).

Figure 5E:
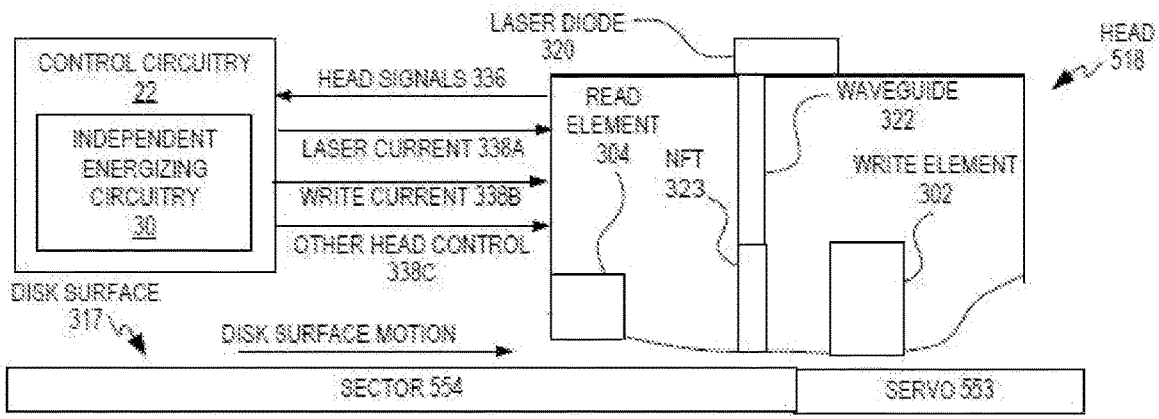

FIG. 5E depicts a conceptual side view of head 518 positioned in flight emerging from proximate to servo pattern 553 to arrive proximate to subsequent data sector 554, subsequent to the state depicted in FIG. 5D, in accordance with aspects of this disclosure. In the state of head 518 flying over disk surface 317 depicted in FIG. 5E, read element 304 and NFT 323 are now positioned proximate to data sector 554, while write element 302 still briefly remains positioned proximate to the finishing sections of servo pattern 553. In this state, as soon as NFT 323 has safely cleared servo pattern 553, in various examples, independent energizing circuitry 30 may begin applying the write laser bias current to laser diode 320 for an upcoming new write operation. Control circuitry 22 including independent energizing circuitry 30 may begin applying the assistive energy current to laser diode 320 while not yet applying the write current to write element 302, during the short interval of time while NFT 323 is safely positioned proximate to data sector 554 (and not servo sector 553) and while write element 302 is positioned proximate to servo pattern 553 (492 in FIG. 4).

In examples in which control circuitry 22 is ready to perform a write operation to data sector 554, the assistive energy current that control circuitry 22 applies to laser diode 320 when NFT 323 first arrives proximate to data sector 554 and write element 302 is about to arrive proximate to data sector 554 may be at a write laser bias current for beginning a write operation to data sector 554. In other examples, control circuitry 22 may not write to data sector 554 but may be preparing for a subsequent write operation to a different data sector, and in these cases, independent energizing circuitry 30 may apply the assistive energy boosted pre-bias current to laser diode 320 at a write-independent value, such as a boosted pre-bias value of current to prepare for the subsequent sector write operation to a different data sector, while still not applying the write current to write element 302, during flight of head 518 over data sector 554.

In various examples, independent energizing circuitry 30 may apply a boosted pre-bias current at a data-safe boosted pre-bias value to laser diode 320 while refraining from writing while flying over pre-existing data. Independent energizing circuitry 30 may apply the data-safe boosted pre-bias value of the boosted pre-bias current to optimize the value of the current such that the boosted pre-bias current is as close to ideal pre-bias as possible without unacceptably damaging proximate data. This may involve a current that, at the margins, such as in short anomalous decreases or dips in fly height, has a possibility of imposing some small, acceptable level of erosion of data. Such an acceptable level of erosion of data may be a level which either poses insignificant erosion of SNR of the data, or that independent energizing circuitry 30 can compensated for, such as with an erosion counter and refresh writes. While any erosion of data is contrary to design performance goals, the boosted pre-bias current is intended to eliminate or resolve other factors contrary to design performance goals such as initial transients and laser mode hops due to changing conditions of laser diode 320 and head 318 in write operations, and independent energizing circuitry 30 may be configured to optimize the boosted laser pre-bias current between these competing design constraints.

In cases of possible data erosion due to boosted laser pre-bias, independent energizing circuitry 30 may use a down track data erosion increment counter to track potential accumulated incremental erosion of data due to proximate flights of NFT 323 while independent energizing circuitry 30 is applying boosted pre-bias current to laser diode 320. Independent energizing circuitry 30 may thereby track and determine if and when accumulated incremental erosion to any given data may have risen to a level in which data integrity may begin to be compromised, and may then perform a refresh write of that impacted data. Independent energizing circuitry 30 may illustratively perform refresh writes by reading the impacted data, and performing the read with extra read intensity if needed to ensure integrity of the data read operation, and then performing a new, refreshed rewrite of the same data superimposed onto the impacted data, thereby returning the data strength to a nominal maximum. Independent energizing circuitry 30 may thereby fully resolve the prior effects of data erosion. Independent energizing circuitry 30 may perform such refresh writes as a background process in times and opportunities of spare operating capacity such that the refresh writes have little or no impact on operating performance parameters, in various examples. Combining boosted laser pre-bias with the erosion tracking data store and refresh writes may thus form a best possible or other advantageous multi-factor optimization of both preserving integrity of previously written data and performing new data write operations with reliability and precision, in various examples.

As shown in the example of FIG. 3, control circuitry 22 may also include a write/read down-track offset calibration data store 31. Write/read calibration data store 31 includes calibration data that control circuitry 22 may use to fine-tune read and write down-track offset operations, such as precision measurements of the down-track offset positions of transitions from data sectors to subsequent WRR areas to subsequent servo patterns and to the subsequent data sectors, for all of the data sectors and servo patterns on all of the disk surfaces 17 of disk drive 15. Write/read calibration data store 31 comprises, with precision measurements, a write-read calibration lookup table or other type of data store for positions across a stroke of the corresponding disk surface, an assistive energy interface to write element (e.g., downtrack RWO) calibrated distance table or other type of data store that indicates a distance between the assistive energy interface to write element for the selected head, and a table or other type of data store for a data sector length allocation between each of one or more pairs of servo patterns. Control circuitry 22 may record the minimum WRR as the RWO minus the worst-case NFT-to-writer-offset (NWO, or displacement between the NFT and the write element, where NWO is short relative to RWO). Independent energizing circuitry 30 may use the recorded minimum WRR in operating the laser current to avoid the boosted pre-bias erasing part of the servo pattern. The position data in write/read calibration data store 31 may account and correct for variations away from ideal in the precise positions on disk surface 317 where servo patterns begin and end in the servo writing process in manufacturing, around which the data sectors and WRR areas are defined. Control circuitry 22 may create and store data to the write/read calibration data store 31 in the late stages of the manufacturing process of disk drive 15, in various examples. Control circuitry 22 may create write/read calibration data store 31 in the form of a write/read calibration lookup table, or any other accessible stored data structure or other form of data store for storing and referencing data, in different examples.

Independent energizing circuitry 30 may use this calibration data from write/read calibration data store 31 to ensure precision operation of non-write, pre-bias, and boosted pre-bias application of assistive energy current to laser diode 320, and to optimize stopping and starting boosted pre-bias application of assistive energy current to laser diode 320 before servo patterns, independently of write operations and of applying write current to write element 302, in various examples. Independent energizing circuitry 30 may stop applying write-independent assistive energy current to laser diode 320 before servo patterns using the data from write/read calibration data store 31 to determine when and at what position to stop applying the assistive boosted pre-bias energy current, in various examples. Independent energizing circuitry 30 may thus be configured such that applying the assistive energy current to the assistive energy emitter in the form of laser diode 320 while refraining from applying the write current to write element 302 comprises applying the assistive energy current based on a calibration data store in the form of write/read calibration data store 31 comprising read and write position calibrations with reference to positions across disk surface 317, in various examples. Independent energizing circuitry 30 may be further configured such that applying the assistive energy current based on the calibration data store comprises optimizing, based on the calibration data store, an amount of time to spend applying the assistive energy current while the assistive energy interface is positioned proximate to an area preceding a servo pattern of the corresponding disk surface. Independent energizing circuitry 30 may thereby maximize the amount of time spent applying boosted pre-bias to laser diode 320 to high precision, while also precisely refraining from applying assistive energy current while NFT 323 is positioned proximate to servo patterns in the flight path of head 317, in various examples. Independent energizing circuitry 30 may thereby avoid, with high precision, exposing the servo patterns to damaging levels of heat that could induce erosion of the servo patterns.

Independent energizing circuitry 30 may also be configured in various ways to format at least one of one or more servo pattern areas and one or more data sector areas of the corresponding disk surface 317 to optimize applying the assistive energy current to the assistive energy emitter in the form of laser diode 320 at one or more boosted pre-energizing or boosted pre-bias values. As noted, the boosted pre-energizing or boosted pre-bias values are configured to pre-energize laser diode 320 prior to a write operation, without damaging or erasing existing servo patterns or data. Optimizing applying boosted pre-energizing or boosted pre-bias assistive energy current may include independent energizing circuitry 30 optimizing time spent applying a boosted pre-bias current, optimizing values of the boosted pre-bias current applied, or both, during times while control circuitry 22 is refraining from applying a write current or performing write operations. Formatting the servo pattern areas, the data sector areas, or both, to optimize applying the assistive energy current at the one or more pre-energizing values, may include any of various techniques and methods.

In various examples, independent energizing circuitry 30 may format data sectors in a way such that independent energizing circuitry 30 increases or maximizes time it can spend applying pre-bias current at levels that are optimized for boosted pre-bias without needing to be limited to also safeguard adjacent data proximate to the flight path of head 318. In various examples, the optimum boosted pre-bias value may be higher than a proximate data protective value. A proximate data protective value of assistive energy current may be a highest boosted laser pre-bias value that is still consistent with avoiding damaging pre-existing data in an adjacent or proximate data sector. A proximate data protective value of boosted laser pre-bias current that independent energizing circuitry 30 may apply may thus be higher than a conventional, conservatively safe value of laser pre-bias current.

In various examples also, since independent energizing circuitry 30 seeks to apply the highest safe boosted pre-bias currents, it may occasionally go just barely beyond an optimum safe boosted pre-bias current and incur marginal erosion of data. In these cases, independent energizing circuitry 30 may record a count of potential data erosion on each such occurrence, and when a limit is reached, perform a data refresh write of the eroded track, either on the same track or on a relocated track. At times when head 318 is in flight over proximate data sectors that contain pre-existing data or servo patterns, independent energizing circuitry 30 may apply safe pre-bias current, potentially including safe boosted pre-bias, at the proximate data protective value or values, while independent energizing circuitry 30 may apply the higher, optimum boosted pre-bias current at times when head 318 is in flight over proximate data sectors that are empty of pre-existing data. Independent energizing circuitry 30 may then seek to optimize and maximize the amount of time that it can spend applying boosted pre-bias current to laser diode 320 while head 318 is in flight above data sectors that are empty of pre-existing data, so that independent energizing circuitry 30 can maximize the proportion of write operations that are initiated after a boosted pre-bias that is optimized only for the boosted pre-bias rather than boosted pre-bias at a lower boost value that is optimized under the added constraint of refraining from damaging pre-existing data in the approach flight path to the new write operation.

Independent energizing circuitry 30 may thus apply boosted pre-bias current at WRR areas, including extended WRR areas, in various examples. Independent energizing circuitry 30 may also further apply and make use of the concept of an extended WRR area by selecting disk surface positions to write to that are favorable to using boosted pre-bias current. This may include independent energizing circuitry 30 selecting to write to a sector after an empty sector. This may also include independent energizing circuitry 30 selecting to write to a sector after a sector that has pre-existing data but with either no prior boosted pre-bias erosion, or relatively little potential prior boosted pre-bias erosion, in comparison to other sector options for writing to, as independent energizing circuitry 30 may determine from its data erosion tracking data store.

Independent energizing circuitry 30 may thus be configured to seek out and select a data sector area to which to write data that is subsequent to a data sector area that is empty of pre-existing data. This is described in terms of "data sector areas" as opposed to "data sectors" where a "data sector area" can include any area of one or more data sectors or potential data sectors, and may include any fraction, multiple, or fractional multiple of any one or more data sectors or potential data sectors, and because the operations of independent energizing circuitry 30 may be more flexible than selecting a data sector per se to which to write data that is subsequent to a data sector per se that is empty of pre-existing data. Independent energizing circuitry 30 may then apply the assistive energy current to laser diode 320 at a boosted pre-bias value that is higher than a proximate data protective value, while the assistive energy interface in the form of NFT 323 is positioned proximate to the data sector area that is empty of pre-existing data. Thereby, independent energizing circuitry 30 optimizes applying the assistive energy current at one or more optimized pre-energizing values on an optimized schedule or for an optimized amount of time, and at an optimized value of pre-bias current.

Independent energizing circuitry 30 may further be configured such that formatting the at least one of the one or more servo pattern areas and the one or more data sector areas of the corresponding disk surface to optimize applying the assistive energy current at the one or more pre-energizing values comprises selecting one or more contiguous data sectors to which to write data that are immediately preceding a data sector that comprises pre-existing data. By writing new data to one or more contiguous data sectors such that the amount of data to write is finished immediately prior to pre-existing data, independent energizing circuitry 30 may keep data compacted, and may maximize or enhance future opportunities to write new data to data sector areas that are subsequent to preceding data sector areas that are empty of pre-existing data, and to apply boosted pre-bias current to laser diode 320 at a fully optimized boosted pre-bias current value rather than at a lower proximate data protective pre-bias value.

Independent energizing circuitry 30 may further be configured such that formatting the at least one of the one or more servo pattern areas and the one or more data sector areas to optimize applying the assistive energy current at the one or more pre-energizing values comprises independent energizing circuitry 30 being configured to, in response to detecting a fragmented plurality of sets of data that are fragmented among data sector areas that are empty of data or, equivalently, that have old data that have been deleted, rewrite the fragmented plurality of sets of data into one or more compacted sets of contiguous data. By compacting the existing fragmented data and rewriting the fragmented data into compacted form, independent energizing circuitry 30 may free up more and longer contiguous sets of potential data sector areas that are empty of pre-existing data, thereby again maximizing or enhancing future opportunities for it to apply boosted pre-bias current to laser diode 320 at a fully optimized boosted pre-bias current value rather than at a lower proximate data protective boosted pre-bias value.

In some write operations, control circuitry 22 may finish a write operation before the end of a data sector, and may not have further data to begin writing in a subsequent space before read element 304 flies proximate to and reads servo pattern 553. In this case, independent energizing circuitry 30 may begin applying boosted pre-bias current after control circuitry 22 finishes the write operation, while head 318 is still in flight above the remaining unused gap before read element 304 encounters and reads servo pattern 553. Independent energizing circuitry 30 may begin applying assistive energy boosted pre-bias current to laser diode 320 either immediately after control circuitry 22 finishes the write operation, or on any other schedule. Independent energizing circuitry 30 may apply assistive energy boosted pre-bias current to laser diode 320 at a fully optimized, non-data-protective pre-bias value through the extended WRR area comprising the remaining portion of the unused gap space of the sector between the end of the written data and the following minimally required WRR area, through head 318 finishing flying with NFT 323 proximate to the end of the WRR area, prior to NFT 323 coming into position proximate to the following servo pattern, in various examples. Independent energizing circuitry 30 may thus be further configured to apply the assistive energy current to laser diode 320 while the assistive energy interface in the form of NFT 323 is positioned proximate to the unused gap in a sector between an end of data in the sector and a subsequent servo pattern of the corresponding disk surface. By implementing the techniques described above, independent energizing circuitry 30 may perform the next consecutive data sector write operation on the same track subsequent to applying a boosted pre-bias to prepare for the write operation, to achieve a higher writing quality.

While various examples are described above in which the assistive energy emitter takes the form of laser diode 320, other examples may comprise an assistive energy emitter in the form of any other type of laser-emitting component, and independent energizing circuitry 30 may apply an assistive energy current to the laser-emitting component. In other examples, the head may comprise an assistive energy emitter in any other form that emits any kind of energy. For example, the head may comprise a magnetron or other microwave-emitting component, and a microwave waveguide operatively coupled thereto, for applying microwave assistive energy to the disk surface in microwave-assisted magnetic recording. In microwave-assisted examples, the assistive energy current applied while refraining from applying the write current comprises a microwave pre-bias current applied to the microwave-emitting component.

Figure 5F:
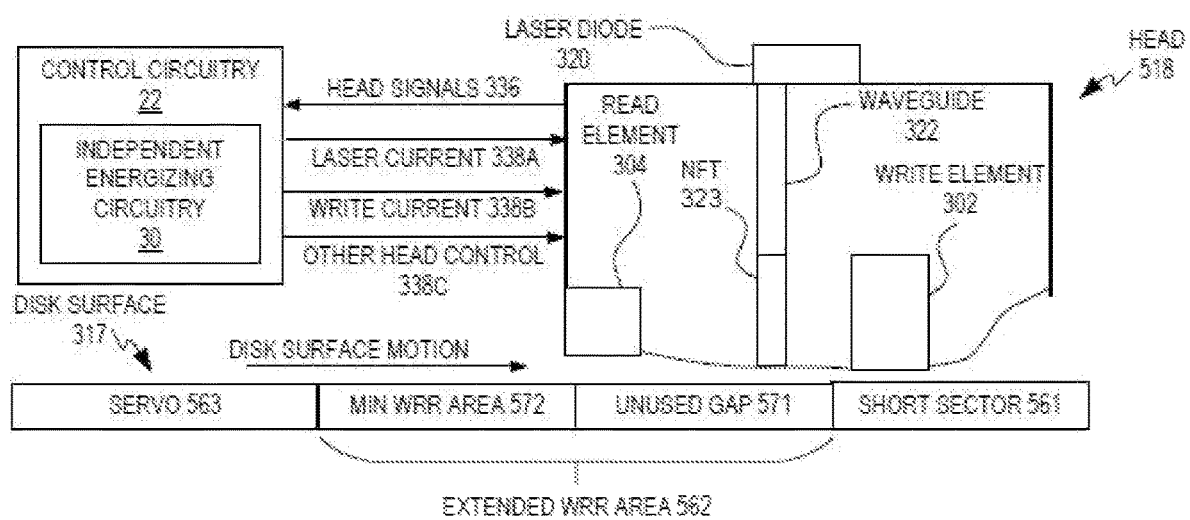
FIG. 5F depicts a conceptual side view of a head positioned in flight transitioning over the end of a short data sector and a subsequent extended write-to-read recovery (WRR) area between the short data sector and a subsequent servo pattern, in accordance with aspects of this disclosure.

FIG. 5F depicts a conceptual side view of head 518 positioned in flight transitioning over the end of a short data sector 561 and a subsequent extended WRR area 562 between data sector 561 and a subsequent servo pattern 563, in accordance with aspects of this disclosure. Extended WRR area 562 comprises an unused gap area 571 in the potential data sector portion of the track, followed by the minimum WRR area 572 defined by the displacement between read element 304 and write element 302, and which control circuitry 22 may measure and calibrate across the stroke of disk surface 317. The state depicted in FIG. 5F is thus somewhat analogous to that depicted in FIG. 5B, in which NFT 323 has just become positioned proximate to the WRR area while write element 302 is just finishing being positioned proximate to a data sector, except that in the case depicted in FIG. 5F, the data sector is a short data sector 561 and the WRR area is the resulting subsequent extended WRR area 562. Head 518 thus has a longer duration of flight after finishing writing and then flying away from the data of short sector 561 before read element 304 enters position proximate to servo pattern 563. Extended WRR area 562 may give independent energizing circuitry 30 more time and greater flexibility in applying an independent boosted pre-bias current to laser diode 320, after finishing writing data sector 561. Independent energizing circuitry 30 may power down write element 302 after writing short data sector 561, and apply assistive energy boosted laser pre-bias current to laser diode 320 while NFT 323 has an extended flight over extended WRR area 562 prior to NFT 323 encountering and entering position proximate to servo pattern 563, in this example.

Figure 6:
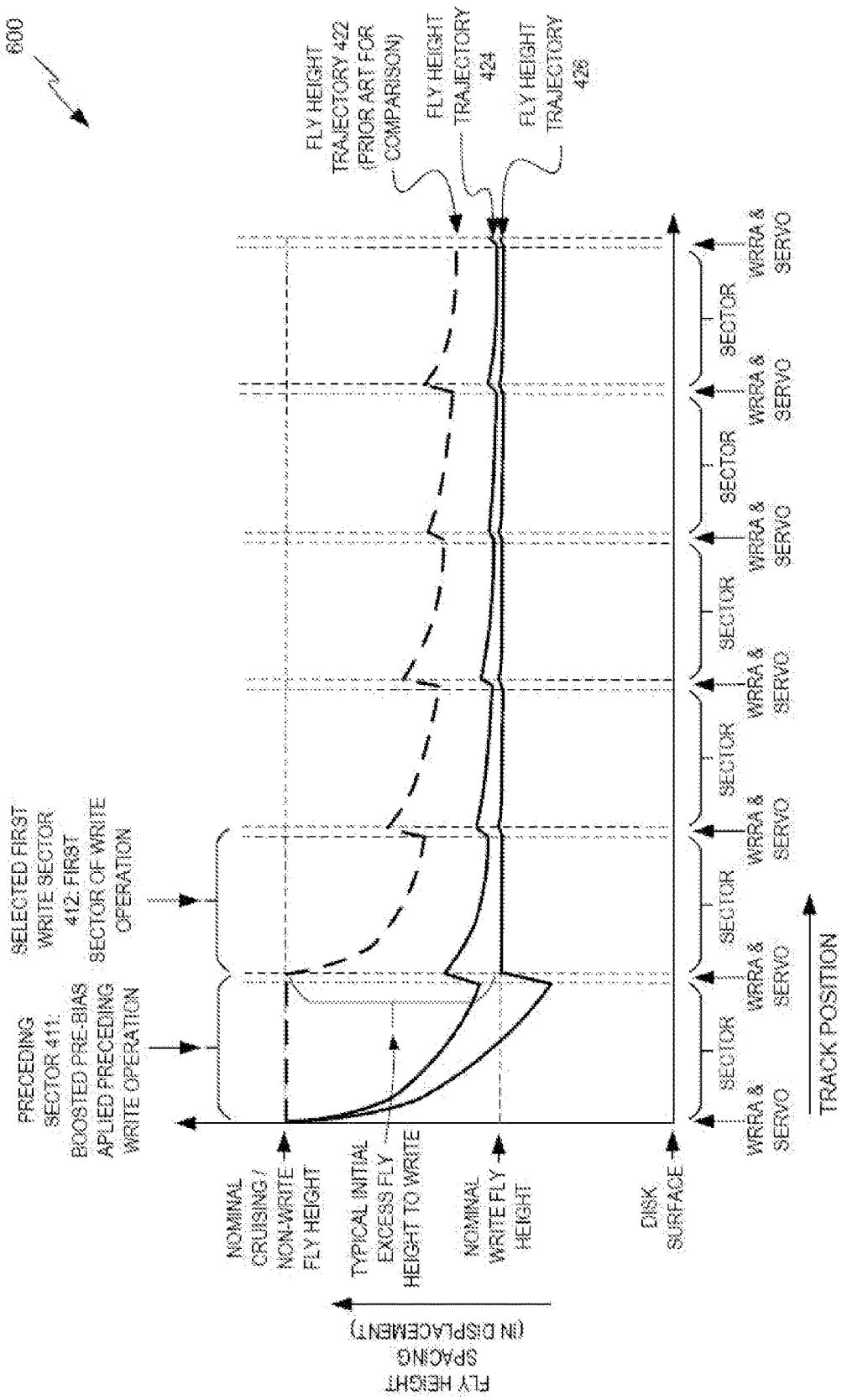
FIG. 6 depicts a conceptual graph illustrating two example novel fly height trajectories and of fly height or head-disk spacing over time between a write element of a head and corresponding disk surface, including the effects of NFT pole tip protrusion (NPTP) and of applying an independent pre-energizing assistive energy current by independent energizing circuitry, in accordance with various aspects of this disclosure.

FIG. 6 depicts a conceptual graph 600 illustrating two example novel fly height trajectories 424 and 426 of fly height or head-disk spacing over time between a write element of a head 318 and corresponding disk surface 317 as shown in FIG. 3, including the effects of NPTP and of applying an independent pre-energizing assistive energy current (e.g., boosted laser pre-bias current) by independent energizing circuitry 30, in accordance with various aspects of this disclosure. Fly height trajectories 424 and 426 are depicted in a preceding sector 411 that precedes a write operation, in which independent energizing circuitry 30 applies a boosted pre-bias current independent of and while refraining from applying a write current, and in subsequent sectors beginning with a selected first write sector 412 to which to write data during a write operation over several sectors, in accordance with aspects of this disclosure. As shown, the applying of the independent pre-energizing assistive energy boosted pre-bias current to the laser diode while refraining from applying a write current during sector 411 by independent energizing circuitry 30 has the effect of transporting head 318 close to or at the nominal fly height for the start of the write operation at the beginning of sector 412, in both example fly height trajectories 424 and 426 of this disclosure.

Fly height trajectory 422 of a conventional HAMR disk drive is also shown for comparison, in which assistive energy boosted pre-bias current is applied in tandem with write current, and fly height begins the write operation much farther from nominal, to emphasize how much better the fly height and initial write strength performance is in examples of this disclosure with independent, opportunistic applying of boosted pre-bias current by independent energizing circuitry 30. Among the inventive discoveries and insights of this disclosure is that these off-nominal fly height effects as depicted in FIG. 6, most particularly in the first write sector 412 of a write operation, have typically interfered with nominal write operations, due to the head being at so much higher than nominal write fly height, as well as at highly varying fly heights, especially throughout the first write sector 412, such that the data write strength is substantially attenuated, especially throughout the first write sector 412, and significantly in the next several following sectors written, in various examples. This has typically resulted in data being written far below nominal write strength, if at all written with any recoverable signal-to-noise ratio (SNR), in the early part of a HAMR write operation, especially in the first sector 412 of a write operation, such that the write to the first sector 412 or part of sector 412 has not been reliable or usable.

Independent energizing circuitry 30 successfully resolves these issues, in various aspects of this disclosure. Independent energizing circuitry 30 successfully enables reliable HAMR write operations beginning with the first sector, among other inventive advantages in accordance with aspects of this disclosure.

Fly height trajectories 424 and 426 both illustrate examples of independent energizing circuitry 30 selecting the block of sectors beginning with sector 412 to which to write, based at least in part on sector 412 being subsequent to sector 411 which is unused and empty of pre-existing data. That is, independent energizing circuitry 30 may select the sector 412 to which to write data, where selecting sector 412 to which to write data includes selecting a sector subsequent to a sector 411 that does not comprise pre-existing data, in this example. This is an example of independent energizing circuitry 30 being configured such that formatting the data sector areas of the corresponding disk surface to optimize applying the assistive energy current at the one or more pre-energizing values comprises selecting one or more contiguous data sectors to which to write data that are immediately subsequent to a data sector that does not comprise pre-existing data.

This lack of pre-existing data in sector 411 gives independent energizing circuitry 30 leeway to apply high boosted laser pre-bias current to laser diode 320 while head 318 is in flight over preceding sector 411, including at levels at and above levels that would damage or destroy any pre-existing data if any had existed in preceding sector 411. In particular, in the example of fly height trajectory 424, independent energizing circuitry 30 applies a boosted laser pre-bias current equal to the full nominal write laser current used during a write operation, while head 318 flies over preceding sector 411. Independent energizing circuitry 30 continues applying a boosted laser pre-bias assistive energy current equal to the full nominal write laser current while NFT 323 of head 318 flies over and proximate to the WRR area (WRRA) between preceding sector 411 and the subsequent servo pattern preceding sector 412, even while control circuitry refrains from applying the write current to write element 302. (The WRR areas preceding the servo patterns are not depicted separately from the servo patterns on the scale of FIG. 6.) In the example of fly height trajectory 426, while NFT 323 of head 318 flies over preceding sector 411 and the subsequent WRR area, independent energizing circuitry 30 applies a laser pre-bias current moderately higher than the full nominal write laser current used during a write operation, just enough or approximately so to fully pre-compensate for laser diode 320 and head 318 cooling back down a little in the absence of the pre-bias current while independent energizing circuitry 30 refrains from applying the assistive energy value of current while head 318 flies over the servo pattern, in the example of FIG. 6.

In fly height trajectory 424, with independent energizing circuitry 30 applying a boosted pre-bias current that is equal or substantially equivalent to the nominal write laser current during flight proximate to the preceding sector 411, head 318 exhibits a fly height that approaches much of the way toward the nominal write fly height during the head's passage proximate to preceding sector 411, rebounds back upward moderately during the passage of NFT 323 across the servo pattern immediately prior to the write operation, and then head 318 begins the write operation at the beginning of the selected first write sector 412 at close to the ideal write fly height, and dramatically closer to ideal write fly height than in the prior art example of fly height trajectory 422. Accordingly, head 318 is already ready to perform nominal, reliable writing of data to first write sector 412 from the beginning of the write operation to first write sector 412.

Under ongoing control by independent energizing circuitry 30, head 318 continues within a nominal fly height range and asymptotically approaching ideal write fly height over the course of the write operation, continuing to stay at essentially the same fly height level as independent energizing circuitry 30 continues applying the pre-energizing assistive energy boosted pre-bias current during passage of NFT 323 of head 318 over each WRR area and then with a short rebound while briefly lowering the laser pre-bias to a safe baseline value below an assistive energy boosted value of pre-bias current during passage of NFT 323 over each servo pattern between sectors, and head 318 continues performing a nominal write operation. Relative to the prior art example of fly height trajectory 422, fly height trajectory 424 shows a much more moderated repeating pattern of a jump in fly height at each servo pattern interval between sectors and then another, milder asymptotic descent in fly height over the course of each subsequent sector of the write operation. This coincides with independent energizing circuitry 30 reducing current applied to laser diode 320 safely below write-assistive boosted pre-bias value and control circuitry 22 powering down write current applied to write element 302 safely below a write value, to prevent damage to servo patterns. Control circuitry 22 also prevents potential damage to write element 302 or NFT 323 due to fly height spacing loss. Independent energizing circuitry 30 also reduces current applied to laser diode 320 safely below write-assistive boosted pre-bias value and control circuitry 22 reduces write current applied to write element 302 safely below a write value to prevent cross-talk or read interference as read element 304 of head 318 passes over the servo patterns to read the servo information to maintain fine control of navigation.

In fly height trajectory 426, with laser pre-bias management circuitry 30 applying a boosted laser pre-bias current moderately higher than the nominal write laser current during flight proximate to the preceding sector 411, head 318 exhibits a fly height that slightly overshoots the ideal write fly height during the head's passage proximate to preceding sector 411, then rebounds just enough during the head's passage across the servo pattern immediately prior to the write operation to arrive right at the theoretically ideal nominal write fly height, just as head 318 begins the write operation at the beginning of the selected first write sector 412. This moderate overshoot in temperature and spacing of the head thus enables the head to cool just enough while NFT 323 flies over the final pre-write servo pattern for laser diode 320 and head 318 to arrive at the ideal temperature and spacing as head 318 finishes flying over the servo wedge and begins flying over the first sector 411 to write, and as independent energizing circuitry 30 resumes applying a write-assistive energy value of current (or assistive energy current) to the laser diode to operate the laser now at the nominal laser write current, as control circuitry 22 initiates the write operation. In both example cases of fly height trajectories 424 and 426, by independent energizing circuitry 30 continuing to apply pre-energizing assistive energy current independently to laser diode 320 during passage of NFT 323 of head 318 over each WRR area, whether minimal or extended WRR area, even while control circuitry 22 refrains from applying a write current to write element 302, independent energizing circuitry 30 gains additional advantage in pre-energizing laser diode 320 and head 318 into being optimally close to steady state across the initiation and duration of the write operation to each data sector, even with the gaps in the assistive energy value of current during flight of NFT 323 proximate to each servo pattern.

In other examples, the pre-energizing assistive energy current may be a substantial fraction of the nominal write laser current, such as at least half of the nominal write laser current. In other examples, the pre-energizing assistive energy current may be at or above a laser threshold of the laser diode or other laser-generating component.

In this way, in some examples, independent energizing circuitry 30 may achieve practically a theoretically ideal steady state in temperature of the laser diode and temperature and fly height of the head from the beginning of the write operation, and a practically theoretically ideal elimination of attenuating effects on write strength from initiation of the write operation. Accordingly, head 318 is already at the theoretically ideal write fly height and ready to perform nominal, reliable writing of data to first write sector 412 from the beginning of the write operation to first write sector 412. Head 318 in fly height trajectory 426 undergoes only a slight loss in thermal energy and NPTP and increase in fly height during crossing of NFT 323 of head 318 over each servo pattern, barely perceptible on the scale of FIG. 6, as independent energizing circuitry 30 temporarily reduces laser current to servo-safe pre-bias levels on each servo crossing of NFT 323, though thermal lag from thermal steady state at the ideal temperature immediately beforehand means that the deviation from ideal is barely if at all significant, in this example. Maintaining the boosted laser pre-bias at the thermal steady state level while NFT 323 flies proximate to the WRR area, while the write element is off and before NFT 323 passes proximate to the servo wedge, contributes to alleviating the slight deviation from ideal. Under ongoing control by independent energizing circuitry 30, head 318 continues operating in practically thermal steady state, and practically steady state in NPTP and its accompanying morphological and aerodynamic modifications of head 318, at the nominal write fly height over the course of the write operation, without non-negligible deviations from nominal write fly height as head 318 continues performing a nominal write operation, in this example.

While fly height trajectory 426 illustrates a case in which the first sector write has no spacing transient (i.e. has completely flat fly height from the start of sector 412), in still other examples, independent energizing circuitry 30 may apply a laser pre-bias current in between or within a similar range as those of the examples of fly height trajectories 424 and 426, or at other values of boosted laser pre-bias that are also higher than nominal write laser current (NWLC) but not as high as for fly height trajectory 426, such that the first sector write operation has the same very small initial fly height transient as the subsequent sector write operations. In these cases, the writing and decoding of the first sector can be made even more consistent with the writing and decoding for the subsequent sectors, and there is no need for any differences to account for the nominal spacing variations from sector to sector. In still other examples, independent energizing circuitry 30 may apply the boosted laser pre-bias to increase as the head approaches the end of each sector and passes over each WRR area, to again pre-compensate either fully or partially for the very small loss of thermal energy and NPTP and very small gain in fly height during crossing of NFT 323 proximate to each servo pattern, as in the case approaching the start of first write sector 412 in fly height trajectory 426.

Figure 7:
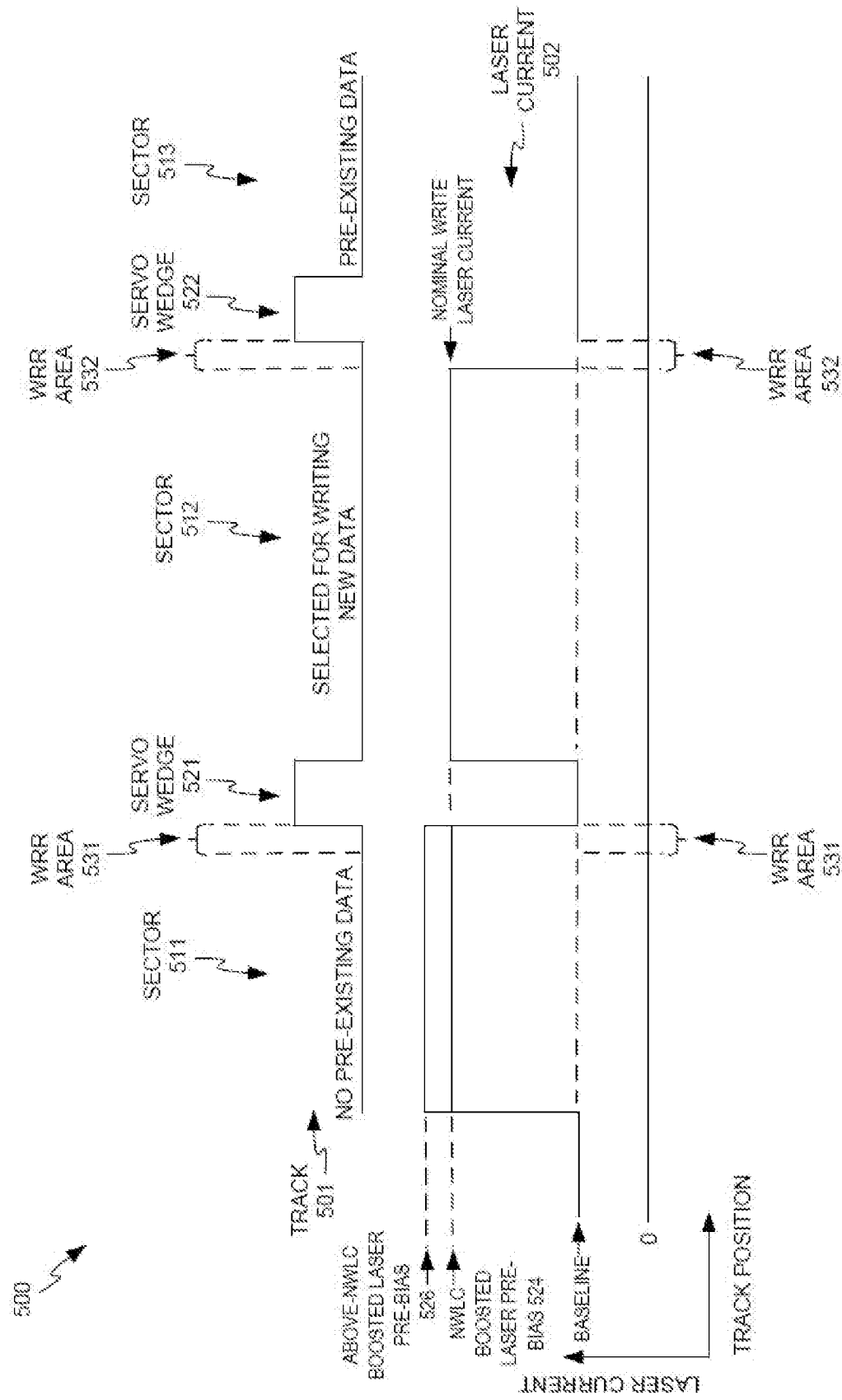
FIG. 7 depicts a conceptual graph of a laser current that independent energizing circuitry may apply to a head, as the head flies over a corresponding track, including two example boosted laser pre-bias current levels, in accordance with aspects of this disclosure.

FIG. 7 depicts a conceptual graph 500 of a laser current 502 that independent energizing circuitry 30 may apply to head 318, as head 318 flies over a corresponding track 501, including two example laser pre-bias current levels 524, 526, in accordance with aspects of this disclosure. These two examples include applying a boosted laser pre-bias current 524 that is equal to the nominal write laser current (NWLC) applied during write operations, and applying a boosted laser pre-bias current 526 that is moderately higher than the nominal write laser current applied during write operations, respectively corresponding to the examples described with reference to fly height trajectories 424, 426 of FIG. 6 as described above.

The present techniques of independently applying assistive energy current independently from write current include novel and inventive techniques of independent energizing circuitry 30 tracking logic block addressing to preferentially and systematically select sectors for performing new write operations subsequent to sectors that contain no prior pre-existing data, to perform write operations to finish immediately prior to pre-existing data in a track, or both. In these ways, independent energizing circuitry 30 may maximize its future opportunities for applying pre-energizing assistive energy current to the assistive energy emitter, including at levels independent of the need to protect proximate data, such as full nominal write current or higher, while refraining from applying a write current to the write element.

Graph 500 shows a conceptual depiction of a portion of a track portion 501 containing sectors and WRR areas and servo patterns between the sectors, and a corresponding laser current graph 502 of laser current over time at the corresponding positions along track portion 501, in an example of the present disclosure. Track portion 501 includes sequentially ordered sectors 511, 512, and 513, separated by WRR areas 531, 532 and servo patterns 521, 522, respectively.

Graph 500 is shown in terms of write assistance laser current 502 along the y-axis as it corresponds with track position along the x-axis. The x-axis may also practically equivalently be stated in terms of time, since control circuitry 22 operates the disk drive with a highly regular angular speed and nominal servo-to-servo time interval.

In this example, control circuitry 22 has a single sector's worth of data to write. Independent energizing circuitry 30 identifies sequentially contiguous sectors 511 and 512 as empty or blank sectors, without pre-existing data written thereto. Independent energizing circuitry 30 selects sector 512 as the sector in which to perform the write operation, at least in part because it is preceded by empty sector 511, such that independent energizing circuitry 30 has complete freedom to apply boosted laser pre-bias of any value, not limited by any need to protect preceding sector data while the head is proximate to sector 511 in the interval of its approach and descent (e.g., the descent of its write element pole tip) to sector 512. Independent energizing circuitry 30 also selects sector 512 for the write operation in part because it is immediately preceding pre-existing data beginning in sector 513, such that writing to sector 512 will help keep data compacted, and help promote future opportunities to pre-energize for write operations while flying over empty sectors that are empty of pre-existing data, and offer freedom to optimize pre-energizing assistive energy current. Here the single sector 512 to write is for illustrative purposes. The same concept also applies to multiple sector writes.

FIG. 7 illustratively shows independent energizing circuitry 30 outputting a laser pre-bias current to the laser diode of the head while the head is passing proximate to sector 511 at either the same current as the nominal write laser current, in the example of laser pre-bias 524, which is the same value of laser bias current that control circuitry 22 also outputs to the laser diode of the head while the head passes proximate to sector 512 and performs the write operation to write data to sector 512; or at above-nominal write laser current laser pre-bias 526, respectively, in the two examples depicted. In other examples, independent energizing circuitry 30 may output a laser pre-bias current to the laser diode of the head while the head is passing proximate to sector 511 at other currents below or above the nominal write bias current, above conventional pre-bias current values, and above values that would degrade or destroy data in sector 511 if there were any data in sector 511.

Independent energizing circuitry 30 may thus implement a boosted pre-bias laser current that is above-nominal write laser current (above-NWLC), in various examples. Using an above-nominal write laser current may close the fly height spacing gap to even closer than nominal write fly height, ahead of the brief loss of fly height while lowering the laser current while the NFT portion of the head passes over the servo pattern, but such that that brief loss of fly height while lowering the laser current while the NFT portion of the head passes over the servo pattern substantially or precisely places the head at the nominal fly height at the start of sector 512 to be written to, in various examples. Using an above-nominal write laser current may thus thereby pre-emptively substantially or completely compensate for and eliminate changes in fly height during initiation of a write operation, and approach or achieve the theoretical ideal nominal fly height from the first moment of the write operation, in various examples.

In some examples, raising the boosted laser pre-bias current to above the nominal write laser current may be performed in balance with one or more recognized constraints, such as: ensuring fly height does not become too far reduced below nominal during the boosted laser pre-bias; avoiding or limiting interference with or erosion of data on adjacent tracks due to the boosted laser pre-bias current; and preventing or limiting any lifetime reliability effects on the laser diode from operating at hotter energies and temperatures than those of the nominal write laser current. Alternatively, independent energizing circuitry 30 may be configured to detect an accumulated chemical smear around the NFT, such as via detecting an anomalous heat dissipation rate from the head, and may respond to the detection of the accumulated chemical smear by introducing one or more additional, short intervals of flight at fly height spacing moderately below nominal fly height, between write operations, which may help dislodge any accumulated smear around the NFT, in some examples. Independent energizing circuitry 30 may thus respond to detecting the chemical smear by temporarily increasing the boosted pre-bias, while not performing a write operation, to temporarily position the selected head at below a nominal fly height, to attempt to dislodge, reduce, or otherwise mitigate the chemical smear. In different examples, any or all or none of these effects may be significantly applicable, and independent energizing circuitry 30 may be configured to account for any or all or none of them in determining, optimizing, and calibrating an optimum profile of boosted laser pre-bias current over time at which to operate and apply to laser diode 320 and head 318.

Independent energizing circuitry 30 may also be configured to determine whether one or more of these effects should be taken into account as part of a calibration process for each head of the disk drive, to use any one or more of these factors in calibrating an all-factors-optimized boosted pre-bias laser current, which may include timing calibrations for when to turn off and turn on the assistive energy current with reference to a write/read data store, and then to operate in accordance with that determined calibrated all-factors-optimized boosted pre-bias laser current, in various examples. Independent energizing circuitry 30 may perform an initial calibration for each of one or more of the heads of the disk drive as part of a manufacturing process in the factory, and/or may perform later calibration or re-calibration of one or more of the heads in-field as part of its ongoing operations, in various examples.

In accordance with various examples of this disclosure, independent energizing circuitry 30 may also track logic block addresses (LBAs) to select one or more sectors to which to write such that the one or more sectors to which to write are immediately preceding pre-existing data. In the example of FIG. 7 and of writing a single sector, independent energizing circuitry 30 may also use this criterion and select sector 512 based in part on sector 513 having pre-existing data written thereto and preceding sector 511 being empty of pre-existing data, in this example. In this way, independent energizing circuitry 30 may pack data together to continually maximize the number of remaining sectors that have preceding empty sectors with no pre-existing data, rather than allowing data to be written in LBA patterns that are scattered apart and only sub-optimally preserve available track space with preceding empty sectors, in various examples.

FIG. 7 also shows that laser pre-bias management circuitry 30 may maintain the laser pre-bias current during the short segment when NFT passes proximate to WRR area 531 between data sector 511 and servo pattern 521, in some examples. In WRR area 531, control circuitry 22 shuts off the write signal with enough margin to prevent cross-talk interference between write and read for performing a read operation of servo wedge 521, to when the NFT reaches the servo pattern, where too high a boosted pre-bias would damage the servo pattern. Whereas conventional HAMR drives power down or safely reduce assistive energy current to the laser in tandem with powering down or safely reducing write current to the write element, independent energizing circuitry 30 may maintain the laser pre-bias current independently of operating the write element, while the NFT is passing over the WRR, even while control circuitry 22 powers down or refrains from applying the write current to the write element. In this way, independent energizing circuitry 30 may thereby apply the boosted laser pre-bias or other boosted pre-energizing assistive energy current for longer time and at higher current level and bring the head closer to nominal write fly height before the NFT portion of the head flies over servo pattern 521 before the write to sector 512. Independent energizing circuitry 30 may thereby reduce the servo crossing gap time in applying the boosted laser pre-bias assistive energy current or other boosted pre-energizing current, and ensure substantially less reduction in NPTP, before beginning the write operation to sector 512. Independent energizing circuitry 30 may thus be configured to maintain the boosted laser pre-bias current while the NFT is passing over the WRR area 531 preceding the servo wedge 521.

Techniques such as these may thereby enhance or maximize the number of write operations that independent energizing circuitry 30 may perform with no pre-existing data in one or more sectors immediately preceding the one or more sectors to which the new data is to be written. This enables independent energizing circuitry 30 with freedom to apply boosted pre-bias current to laser diode 320 at higher than conventional nominal values of laser pre-bias current, including values approaching or at nominal values of laser write bias current, or higher than nominal values of laser write bias current, proximate to empty sectors where there is no pre-existing data to be damaged or destroyed by the proximity of head 320 in a state of high thermal energy due to the pre-biasing laser diode. By techniques such as these, independent energizing circuitry 30 enables the head to approach or achieve steady state in temperature, in NPTP, in shape and aerodynamic properties, and in fly height early in or prior to initiating the write operation to sector 512, thereby promoting or ensuring nominal write quality and reliable write to sector 512, in various examples.

Independent energizing circuitry 30 may also apply independent boosted laser pre-bias or other assistive energy current across two or more sectors prior to a write operation, in some examples. Independent energizing circuitry 30 may also apply independent pre-energizing assistive energy boosted pre-bias current across only a fraction of the one sector immediately preceding the one or more sectors to write to, or the entire sector immediately preceding the one or more sectors to write to plus a fraction of the sector prior to that, or in other fractional amounts of sectors, in various examples. Independent energizing circuitry 30 may thus be configured to apply independent pre-energizing assistive energy laser pre-bias current to the laser diode of the head across only a fraction of a sector, more than one sector, and any fractional amount of sectors above one sector, prior to a write operation to the selected sector, in any of various examples.

Figure 8:
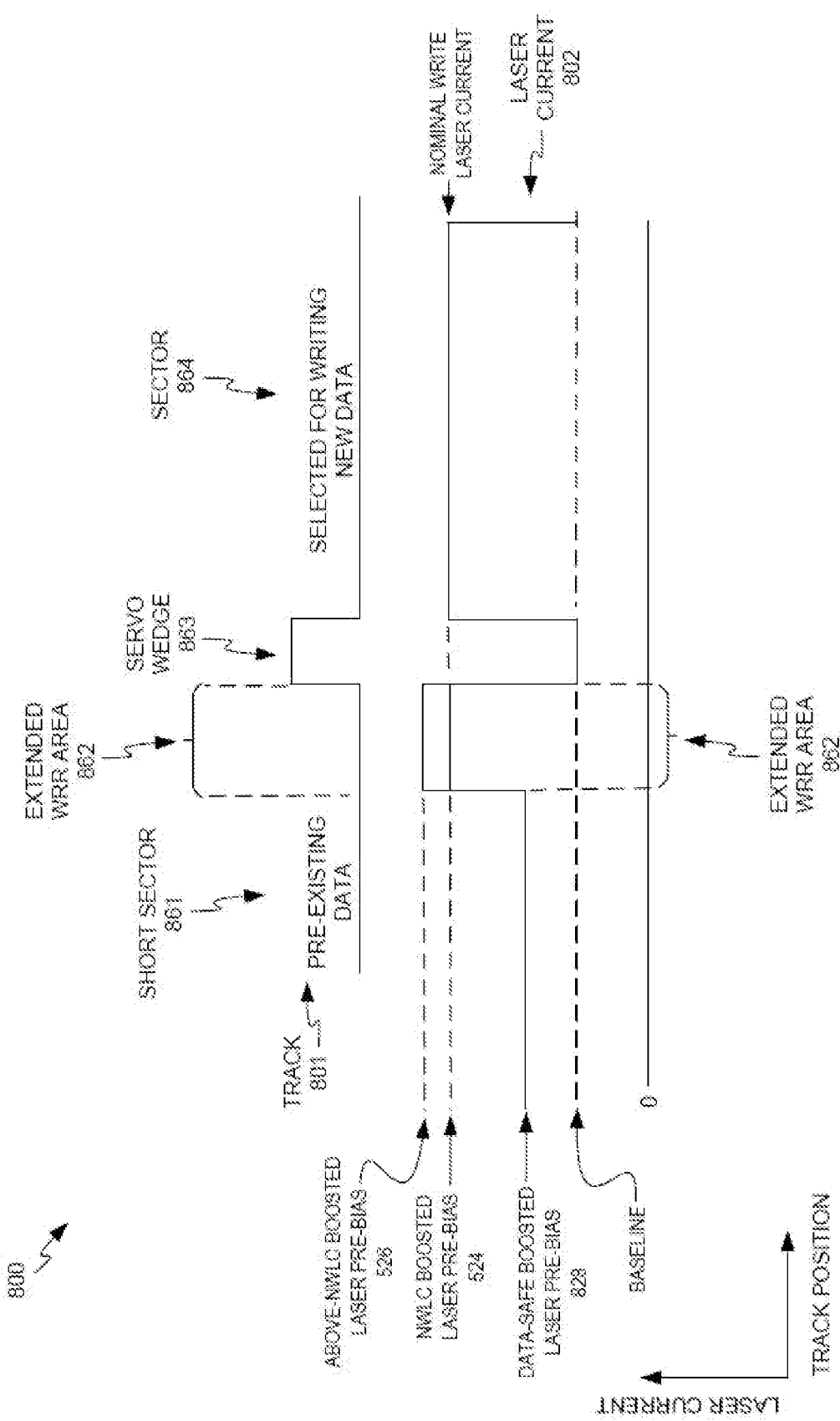
FIG. 8 depicts a conceptual graph of a laser current that independent energizing circuitry may apply to a head in flight over a corresponding track, including three example boosted laser pre-bias current levels in different portions of an approach flight toward a new sector to be written, in accordance with aspects of this disclosure.

FIG. 8 depicts a conceptual graph 800 of a laser current 802 that independent energizing circuitry 30 may apply to head 318, as head 318 flies over a corresponding track 801, including three example boosted laser pre-bias current levels 524, 526, 828 in different portions of an approach flight of head 318 toward a new sector 864 selected to be written, in accordance with aspects of this disclosure. Graph 800 is analogous to graph 500 of FIG. 7, but demonstrates examples of independent energizing circuitry 30 applying a data-safe boosted laser pre-bias current 828 while NFT 323 is in flight positioned proximate to pre-existing data, and then applying a higher boosted laser pre-bias current during flight over an extended WRR area 862, after a short sector 861, to optimally prepare for initiating a write operation to data sector 864, after powering down laser current 802 during flight of NFT 323 of head 318 over servo wedge 863. Independent energizing circuitry 30 may apply a higher boosted laser pre-bias current illustratively at an NWLC-equivalent value boosted laser pre-bias current 524 or an above-NWLC-equivalent value boosted laser pre-bias current 526 as described above, or at advantageously varying values over time, or other optimized values over time.

Independent energizing circuitry 30 may apply data-safe boosted laser pre-bias current 828 to laser diode 320 while NFT 323 of head 318 is in flight over pre-existing data in short data sector 861, in combination with tracking possible data erosion to short data sector 861 in a data erosion tracking data store. Independent energizing circuitry 30 may then use the tracked possible data erosion data for different sectors for selecting sectors for writing that are subsequent to sectors with no or minimal prior possible data erosion, thereby performing data erosion load balancing across disk surface 317. Independent energizing circuitry 30 may also use the tracked possible data erosion data to determine if and when a level of incremental possible data erosion to data sector 861 may have accumulated to trigger independent energizing circuitry 30 performing a refresh write of data sector 861.

Figure 9:
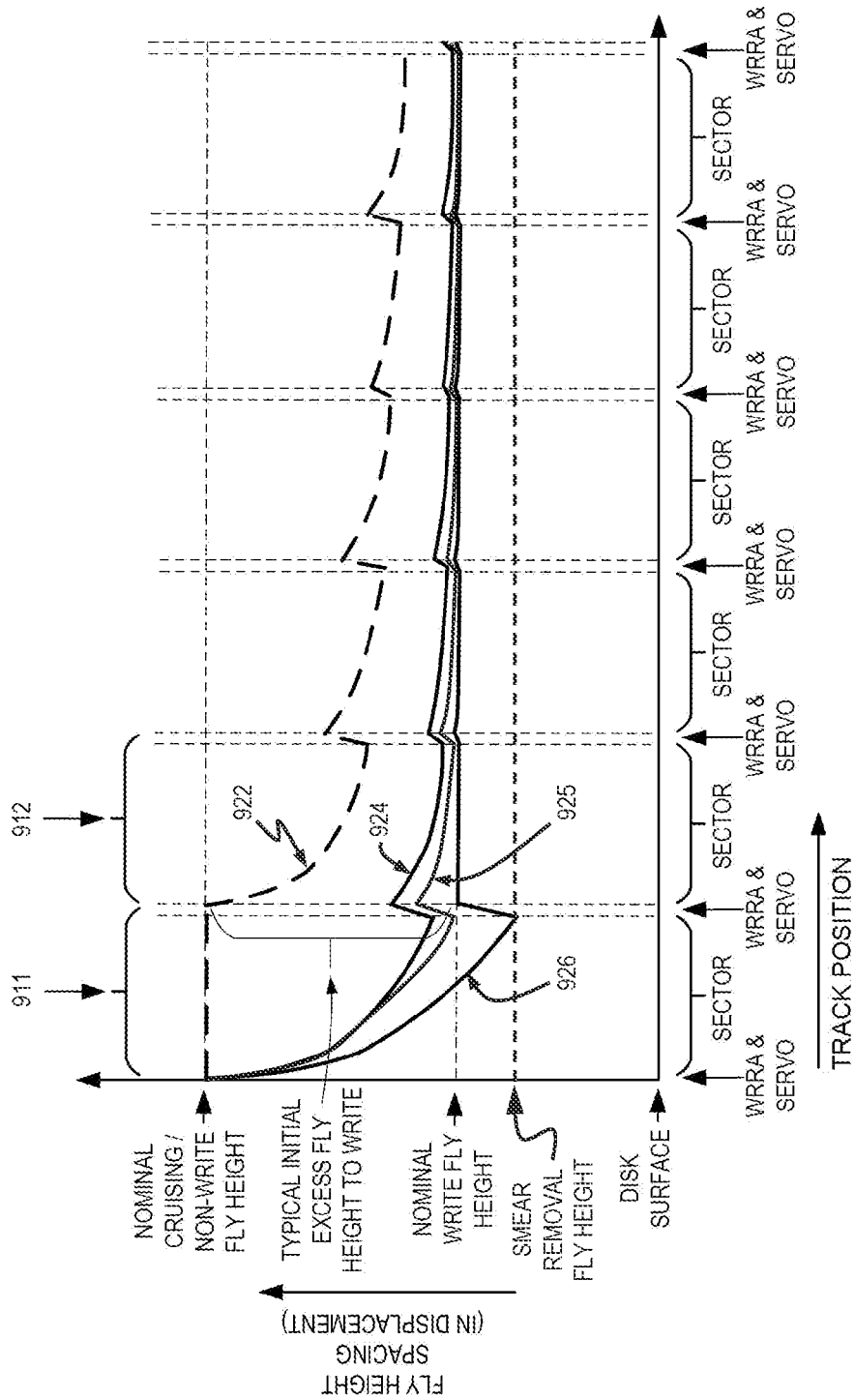
FIG. 9 depicts a conceptual graph illustrating additional exemplary novel fly height trajectories and of fly height or head-disk spacing over time between a write element of a head and corresponding disk surface, including the effects of NFT pole tip protrusion (NPTP) and of applying an independent pre-energizing assistive energy current by independent energizing circuitry, in accordance with various aspects of this disclosure.

FIG. 9 depicts a conceptual graph 900 illustrating additional exemplary novel fly height trajectories 924, 925, and 926 of fly height or head-disk spacing over time between a write element of a head 318 and corresponding disk surface 317 as shown in FIG. 3, including the effects of NPTP and of applying an independent pre-energizing assistive energy current (e.g., boosted laser pre-bias current) by independent energizing circuitry 30, in accordance with various aspects of this disclosure. In FIG. 9, fly height trajectories 922 and 924 correspond, respectively, to fly height trajectories 422 and 424 of FIG. 6. Also in FIG. 9, preceding sector 911 (which may include one or more sectors) and selected first write sector 912 correspond, respectively, to preceding sector 411 and selected first write sector 412 of FIG. 6. Control circuitry 22 comprising independent energizing circuitry 30 may cause head 318 to follow fly height trajectories 925 and 926 by applying a boosted pre-bias current independent of and while refraining from applying a write current in preceding sector 911 similar to the manner described with respect to FIG. 6 but with differences as described herein.

As with fly height trajectories 424 and 426 of FIG. 6, fly height trajectories 924, 925, and 926 of FIG. 9 illustrate examples of independent energizing circuitry 30 selecting the block of sectors beginning with sector 912 to which to write, based at least in part on sector 912 being subsequent to sector 911 which is unused and empty of pre-existing data. This lack of pre-existing data in sector 911 gives independent energizing circuitry 30 leeway to apply high boosted laser pre-bias current to laser diode 320 while head 318 is in flight over preceding sector 911, including at levels at and above levels that would damage or destroy any pre-existing data if any had existed in preceding sector 911.

In accordance with aspects of the present disclosure, control circuitry 22 comprising independent energizing circuitry 30 may cause head 318 to follow fly height trajectory 925 by varying a level (i.e., magnitude) of boosted pre-bias over time while refraining from applying a write current in preceding sector 911. For example, independent energizing circuitry 30 may perform a generalized varying of the boosted pre-bias over time to optimize among some or all of a plurality of performance constraints, such as by finishing the boosted pre-bias on a positive slope of increase over time just prior to the servo pattern, rather than applying a single flat boosted pre-bias being either flat, as in sector 511 in FIG. 7, or varying between two flat values from the data sector to the minimum or extended WRR area, as in FIG. 8, as in the example of short sector 861 and extended WRR area 862 in FIG. 8, in cases in which the write operation is to continue in a subsequent data sector. Increasing the boosted pre-bias toward the end of the boosted pre-bias just ahead of the servo pattern could in effect shift some if not all of off-ideal fly height from a beginning of a subsequent write either to the final interval of a current write, or better, to the regular or extended WRR area. This could correspond to independent energizing circuitry 30 slightly increasing the boosted pre-bias and slightly reducing the fly height just prior to the servo pattern, as shown by fly height trajectory 925 compared to fly height trajectory 924, especially in a regular or extended WRR area (WRRA), so that the boosted pre-bias and fly height remain ideal or nominal for the just-written data sector, while providing better pre-compensation to improve even more the stability of the laser diode and the nominal value of fly height at initiation of the subsequent data sector to write.

Another example of a performance constraint that may be optimized by varying the boosted pre-bias over time is a rate of change of the boost current, which can affect a rate of spacing change. An abrupt spacing change can produce unwanted oscillations/vibrations of the head in the vertical direction. In embodiments, the level of the boosted pre-bias may be varied over time to avoid abrupt spacing changes by providing a smooth rate of change of the boost current, which provides smooth spacing changes. Another example of a performance constraint that may be optimized by varying the boosted pre-bias over time is to coordinate the boost-induced spacing change and TFC-induced spacing change via profiles to achieve a desired combined spacing. These examples of performance constraints are not limiting, and implementations may vary the level of boosted pre-bias over time based on optimizing one or both of these exemplary performance constraints and/or other performance constraints.

In one example, independent energizing circuitry 30 may vary the level of the boosted pre-bias over time by varying a level of assistive energy current applied to an assistive energy emitter, in the form of laser diode 320, such that the level of the assistive energy current increases linearly or decreases linearly through at least a portion of an area preceding the servo pattern. In another example, independent energizing circuitry 30 may vary the level of the boosted pre-bias over time by varying a level of assistive energy current applied to an assistive energy emitter, in the form of laser diode 320, such that the level of the assistive energy current increases in a stepwise manner or decreases in a stepwise manner through at least a portion of the area preceding the servo pattern. In yet another example, independent energizing circuitry 30 may vary the level of the boosted pre-bias over time by varying a level of assistive energy current applied to an assistive energy emitter, in the form of laser diode 320, such that the level of the assistive energy current changes in a non-linear manner through at least a portion of the area preceding the servo pattern. Changing the assistive energy current in a non-linear manner may be achieved when the assistive energy current is applied as a non-linear function of time, such as a quadratic, cubic, exponential, logarithmic, or other non-linear function.

In the example of fly height trajectory 926, while NFT 323 of head 318 flies over preceding sector 911 and the subsequent WRR area, independent energizing circuitry 30 applies a laser pre-bias current higher than the full nominal write laser current used during a write operation, so that the head 318 overshoots the nominal write fly height and moves to a smear removal fly height below the nominal write fly height. In embodiments, the smear removal fly height represents a fly height that is configured to cause the head 318 to be sufficiently close to the disk surface so as to dislodge, reduce, or otherwise mitigate a smear that exists on the head 318.

As previously mentioned, and in accordance with aspects of the present disclosure, control circuitry 22 may be configured to detect a smear on NFT 323 and to adjust a fly height of the head 318, using boosted pre-bias and while not performing a write operation, to a position below the nominal fly height to attempt to dislodge, reduce, or otherwise mitigate the smear. A smear (also called a chemical smear) may contain materials such as carbon, silicon, and/or nitrogen, and may be formed from material that is present in the magnetic recording medium of a disk. A smear may form on head 318 when one or more of these materials accumulates on NFT 323 during operation of a HAMR disk drive. For example, hydrocarbon molecules from the disk overcoat and lubricant can become mobile at elevated temperatures and adsorb on the slider air bearing surface (ABS). Over time, these molecules can form a smear that absorbs power from the laser source and causes NFT 323, which normally operates at very high temperatures, to become even hotter than usual. A smear can block light from the laser source, thereby reducing the amount by which the media is heated during a write process. Furthermore, elevated heat resulting from a smear can degrade an overcoat that protects the tip of NFT 323, possibly leading to failure. A smear can also increase the NFT to media spacing, causing the laser current to be insufficient for the writing at the higher spacing.

Control circuitry 22 may be configured to detect a smear on NFT 323 in various ways. In one example, control circuitry 22 detects a smear by applying an oscillating signal to a heat or light source for NFT 323 to dither the spacing between NFT 323 and the medium. Based upon a change in a contact detection signal, control circuitry 22 can determine that a smear has formed on NFT 323. In another example, control circuitry 22 detects a smear on NFT 323 based on a temperature of NFT 323 being higher than normal during operation, as indicated by a temperature sensor on or at NFT 323, such as an NTS (NFT temperature sensor) nearby NFT 323. The higher temperatures are indicative of an absorbing smear being present on NFT 323 and, thus, may be used by control circuitry 22 to detect the presence of a smear on NFT 323. In another example, control circuitry 22 detects a smear based on the optimal laser current change or touch-down power change.

In accordance with aspects of the present disclosure, in response to detecting a smear on NFT 323, independent energizing circuitry 30 of control circuitry 22 may be configured to increase the assistive energy current applied to the assistive energy emitter (i.e., laser diode 320) to a level that positions the selected head 318 at the smear removal fly height. In embodiments, the smear removal fly height is 0.3 nm to 0.5 nm above the disk surface, although implementations are not limited to this example and other smear removal fly heights may be used.

Figure 10:
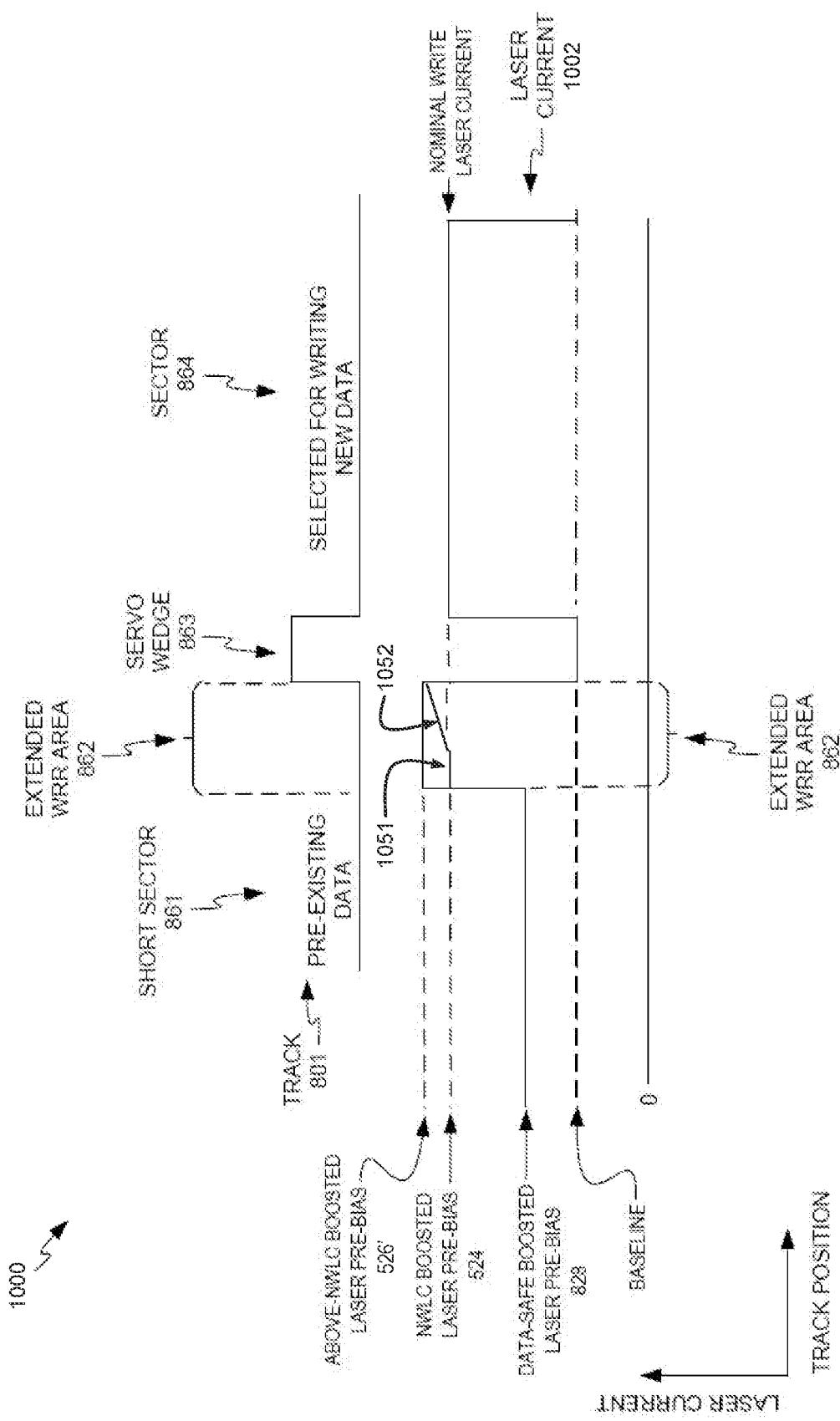
FIG. 10 depicts a conceptual graph of a time-varying laser current that independent energizing circuitry may apply to a head in flight over a corresponding track, including three example boosted laser pre-bias current levels in different portions of an approach flight toward a new sector to be written, in accordance with aspects of this disclosure.

FIG. 10 depicts a conceptual graph 1000 of a laser current 1002 that independent energizing circuitry 30 may apply to head 318, as head 318 flies over a corresponding track 801, including three example boosted laser pre-bias current levels 524, 526', and 828 in different portions of an approach flight of head 318 toward a new sector 864 selected to be written, in accordance with aspects of this disclosure. Graph 1000 is analogous to graph 800 of FIG. 8, but demonstrates examples of independent energizing circuitry 30 applying a data-safe boosted laser pre-bias current 828 while NFT 323 is in flight positioned proximate to pre-existing data, and then applying a time-varying boosted laser pre-bias current during flight over an extended WRR area 862, after a short sector 861, to optimally prepare for initiating a write operation to data sector 864, after powering down laser current 1002 during flight of NFT 323 of head 318 over servo wedge 863. In this manner, independent energizing circuitry 30 may apply a higher boosted laser pre-bias current at varying values over time while NFT 323 is in flight over extended WRR area 862 and while refraining from applying a write current to the write element.

In the example shown in FIG. 10, the boosted laser pre-bias current applied while NFT 323 is in flight over extended WRR area 862 comprises a first section 1051 that is flat (i.e., at a constant level) and a second section 1052 that is non-flat (i.e., with levels that vary over time). In this manner, the boosted laser pre-bias current finishes on a positive slope of increase over time just prior to the servo pattern in servo wedge 863, rather than applying a single flat boosted pre-bias across the entire extended WRR area 862.

Figure 11:
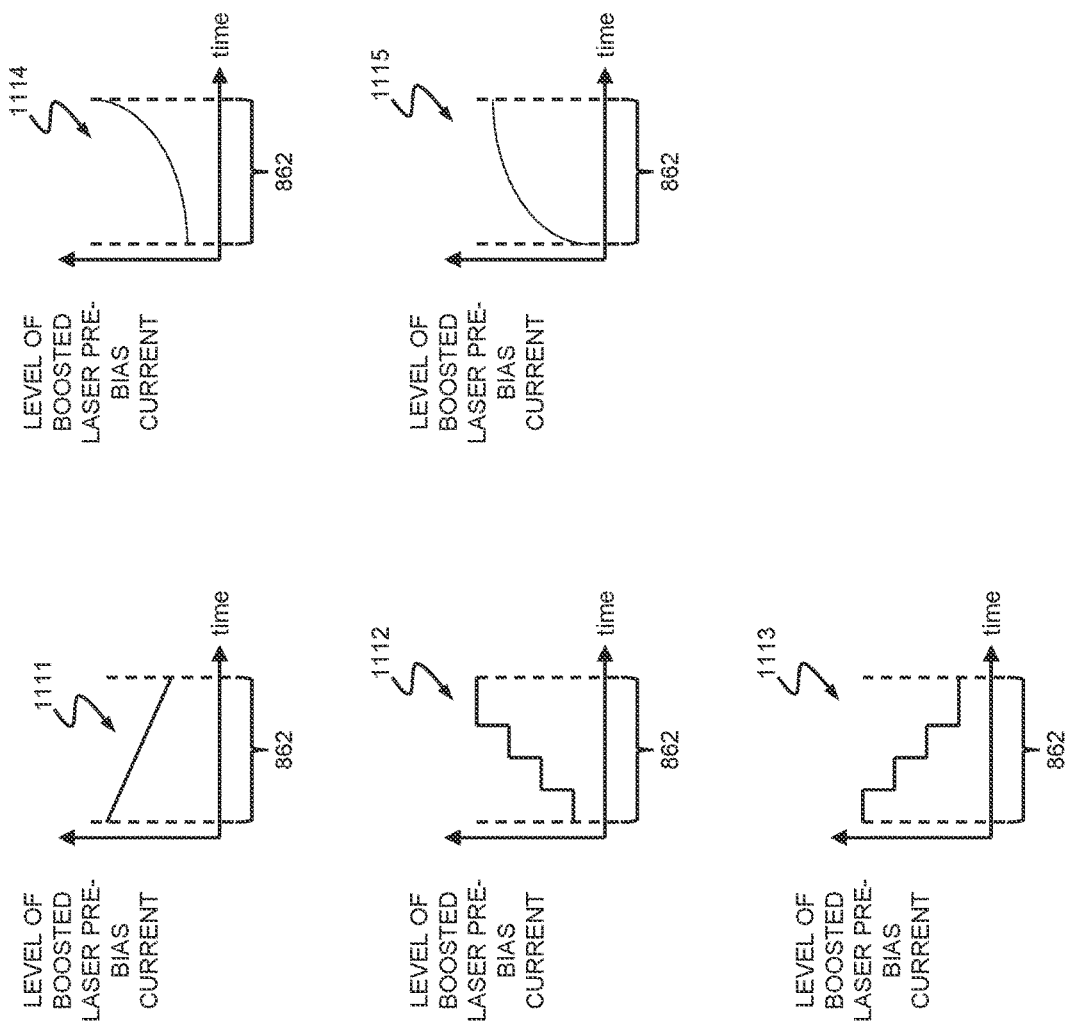
FIG. 11 depicts examples of time-varying laser current that independent energizing circuitry may apply to a head in flight in accordance with aspects of this disclosure.

Embodiments are not limited to the example shown in FIG. 10, and other implementations of time-varying levels of boosted laser pre-bias current may be used while NFT 323 is in flight over extended WRR area 862. Other example include but are not limited to: varying the level of boosted laser pre-bias current such that it decreases linearly during some or all of the time while NFT 323 is in flight over extended WRR area 862 as conceptually depicted at example 1111 of FIG. 11; varying the level of boosted laser pre-bias current such that it increases in a stepwise manner during some or all of the time while NFT 323 is in flight over extended WRR area 862 as conceptually depicted at example 1112 of FIG. 11; varying the level of boosted laser pre-bias current such that it decreases in a stepwise manner during some or all of the time while NFT 323 is in flight over extended WRR area 862 as conceptually depicted at example 1113 of FIG. 11; and varying the level of boosted laser pre-bias current such that it changes in a non-linear manner during some or all of the time while NFT 323 is in flight over extended WRR area 862 as conceptually depicted at examples 1114 and 1115 of FIG. 11. Although not shown, independent energizing circuitry 30 may apply a time-varying level of boosted laser pre-bias current, similar to the examples of FIG. 11, while NFT 323 is in flight over sector 511 and/or WRR area 531 of FIG. 7.

With continued reference to FIG. 10, in embodiments, above-NWLC boosted laser pre-bias current level 526' corresponds to a current level that is configured to cause head 318 to move to the smear removal fly height depicted in FIG. 9. In this manner, independent energizing circuitry 30 may apply above-NWLC boosted laser pre-bias current level 526' in order to position head 318 at the smear removal fly height so as to dislodge, reduce, or otherwise mitigate a smear detected on head 318.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks, the selected head comprising a write element and an assistive energy emitter; and
   one or more processing devices configured to, individually or in combination:
      apply an assistive energy current to the assistive energy emitter while refraining from applying a write current to the write element, and
      vary a level of the assistive energy current over time while refraining from applying the write current to the write element.

2. The data storage device of claim 1, wherein applying the assistive energy current to the assistive energy emitter while refraining from applying the write current to the write element comprises applying a boosted pre-bias current to the assistive energy emitter while refraining from applying the write current to the write element, the boosted pre-bias current being equal to or greater than a nominal write laser current applied during write operations using the selected head.

3. The data storage device of claim 1, wherein:
   the selected head further comprises an assistive energy interface operatively coupled to the assistive energy emitter; and
   the one or more processing devices are further configured to, individually or in combination, apply the assistive energy current to the assistive energy emitter while the assistive energy interface is positioned proximate to an area preceding a servo pattern of the corresponding disk surface.

4. The data storage device of claim 3, wherein the area preceding the servo pattern comprises a write-to-read recovery (WRR) area between a data sector and the servo pattern.

5. The data storage device of claim 4, wherein the area preceding the servo pattern additionally comprises an unused gap in a data sector between an end of data in the data sector and a beginning of the WRR area.

6. The data storage device of claim 3, wherein the one or more processing devices are further configured to, individually or in combination, vary the level of the assistive energy current such that the level of the assistive energy current increases linearly or decreases linearly through at least a portion of the area preceding the servo pattern.

7. The data storage device of claim 3, wherein the one or more processing devices are further configured to, individually or in combination, vary the level of the assistive energy current such that the level of the assistive energy current increases in a stepwise manner or decreases in a stepwise manner through at least a portion of the area preceding the servo pattern.

8. The data storage device of claim 3, wherein the one or more processing devices are further configured to, individually or in combination, vary the level of the assistive energy current such that the level of the assistive energy current changes in a non-linear manner through at least a portion of the area preceding the servo pattern.

9. The data storage device of claim 1, wherein the one or more processing devices are further configured to, individually or in combination, vary the level of the assistive energy current over time while refraining from applying the write current to the write element based on optimizing performance constraints.

10. The data storage device of claim 1, wherein:
    the one or more processing devices are further configured to, individually or in combination:
       detect a smear on an assistive energy interface operatively coupled to the assistive energy emitter; and
       in response to detecting the smear, increase the level of the assistive energy current to a magnitude that positions the selected head at a smear removal fly height below a nominal write fly height.

11. A method comprising:
applying, by one or more processing devices individually or in combination, an assistive energy current to an assistive energy emitter comprised in a selected head of a data storage device while applying a write current to a write element comprised in the selected head, and while the write element is positioned proximate to a data sector;
powering down, by the one or more processing devices individually or in combination, the write current after finishing writing to the data sector; and
applying, by the one or more processing devices individually or in combination, the assistive energy current to the assistive energy emitter at varying levels over time while refraining from applying the write current to the write element.

12. The method of claim 11, wherein the applying the assistive energy current to the assistive energy emitter at varying levels over time comprises linearly increasing or linearly decreasing a magnitude of the assistive energy current while refraining from applying the write current to the write element.

13. The method of claim 11, wherein the applying the assistive energy current to the assistive energy emitter at varying levels over time comprises changing a magnitude of the assistive energy current in a non-linear manner while refraining from applying the write current to the write element.

14. The method of claim 11, wherein the applying the assistive energy current to the assistive energy emitter at varying levels over time is based on optimizing performance constraints.

15. The method of claim 11, further comprising:
detecting, by the one or more processing devices individually or in combination, a smear on an assistive energy interface operatively coupled to the assistive energy emitter; and
in response to the detecting the smear, increasing the assistive energy current, by the one or more processing devices individually or in combination, to a level that positions the selected head at a smear removal fly height below a nominal write fly height.

16. One or more processing devices comprising, individually or in combination:
means for applying an assistive energy current to an assistive energy emitter comprised in a selected head of a data storage device while applying a write current to a write element comprised in the selected head, and while the write element is positioned proximate to a data sector;
means for powering down the write current after finishing writing to the data sector; and
means for applying the assistive energy current to the assistive energy emitter at varying levels over time while refraining from applying the write current to the write element.

17. The one or more processing devices of claim 16, wherein the means for applying the assistive energy current to the assistive energy emitter at varying levels over time comprises means for linearly increasing or linearly decreasing a magnitude of the assistive energy current while refraining from applying the write current to the write element.

18. The one or more processing devices of claim 16, wherein the means for applying the assistive energy current to the assistive energy emitter at varying levels over time comprises means for changing a magnitude of the assistive energy current in a non-linear manner while refraining from applying the write current to the write element.

19. The one or more processing devices of claim 16, wherein the applying the assistive energy current to the assistive energy emitter at varying levels over time is based on optimizing performance constraints.

20. The one or more processing devices of claim 16, further comprising, individually or in combination:
means for detecting a smear on an assistive energy interface operatively coupled to the assistive energy emitter; and
means for increasing the assistive energy current, in response to the detecting the smear, to a level that positions the selected head at a smear removal fly height below a nominal write fly height.

\* \* \* \* \*